(12) United States Patent
Cha et al.

(10) Patent No.: US 11,901,964 B2
(45) Date of Patent: Feb. 13, 2024

(54) METHOD FOR TRANSMITTING AND RECEIVING SIGNAL IN WIRELESS COMMUNICATION SYSTEM, AND APPARATUS FOR SUPPORTING SAME

(71) Applicant: LG Electronics Inc., Seoul (KR)

(72) Inventors: Hyunsu Cha, Seoul (KR); Suckchel Yang, Seoul (KR); Jiwon Kang, Seoul (KR); Kijun Kim, Seoul (KR); Jeongsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/985,544

(22) Filed: Nov. 11, 2022

(65) Prior Publication Data

US 2023/0079502 A1    Mar. 16, 2023

Related U.S. Application Data

(63) Continuation of application No. PCT/KR2021/005941, filed on May 12, 2021.

(30) Foreign Application Priority Data

May 12, 2020 (KR) .................... 10-2020-0056702

(51) Int. Cl.
*H04B 17/318* (2015.01)
(52) U.S. Cl.
CPC .................... *H04B 17/318* (2015.01)

(58) Field of Classification Search
CPC .................................................... H04B 17/318
See application file for complete search history.

(56) References Cited

U.S. PATENT DOCUMENTS

| | | | |
|---|---|---|---|
| 2019/0380056 A1 | 12/2019 | Lee et al. | |
| 2021/0239783 A1* | 8/2021 | Calcev | G01S 11/08 |
| 2022/0014335 A1* | 1/2022 | Si | H04W 64/00 |
| 2022/0141797 A1* | 5/2022 | Shi | H04W 16/28 |
| | | | 455/456.2 |
| 2022/0159415 A1* | 5/2022 | Khoryaev | H04L 27/261 |
| 2022/0163614 A1* | 5/2022 | Wong | G01S 5/0081 |
| 2022/0252690 A1* | 8/2022 | Zhou | G01S 5/0244 |

OTHER PUBLICATIONS

Ericsson, "DL Reference Signals for NR Positioning," R1-1907508, Presented at 3GPP TSG RAN WG1 Meeting #97, Reno, NV, USA, May 13-17, 2019, 25 pages.
Huawei & HiSilicon, "Physical layer procedure for NR positioning," R1-1910036, Presented at 3GPP TSG RAN WG1 Meeting #98bis, Chongqing, China, Oct. 14-20, 2019, 17 pages.

(Continued)

*Primary Examiner* — Jamal Javaid
*Assistant Examiner* — Ryan C Kavleski
(74) *Attorney, Agent, or Firm* — Fish & Richardson P.C.

(57) ABSTRACT

Various embodiments relate to a next generation wireless communication system for supporting a data transmission rate higher than that of a $4^{th}$ generation (4G) wireless communication system, and the like. According to various embodiments, a method for transmitting and receiving a signal in a wireless communication system and an apparatus for supporting same can be provided. Various other embodiments can be provided.

10 Claims, 32 Drawing Sheets

(56) References Cited

OTHER PUBLICATIONS

International Search Report in International Appln. No. PCT/KR2021/005941, dated Sep. 9, 2021, 3 pages (with English translation).
Mitsubishi Electric, "Views on physical-layer procedures for NR positioning," R1-1911200, Presented at 3GPP TSG RAN WG1 Meeting #98b, Chongqing, China, Oct. 14-Oct. 20, 2019, 3 pages.
Nokia & Nokia Shanghai Bell, "Views on DL reference signals for NR Positioning," R1-1908346, Presented at 3GPP TSG RAN WG1 #98, Prague, CZ, Aug. 26-30, 2019, 6 pages.
Vivo, "Remaining issues on physical-layer procedures for NR positioning," R1-1912047, Presented at 3GPP TSG RAN WG1 #99, Reno, USA, Nov. 18-22, 2019, 6 pages.
Catt, "Summary #3 of UE and gNB measurements for NR Positioning," 3GPP TSG RAN WG1 Meeting #98, R1-1909737, Prague, Czech Republic, Aug. 26-30, 2019, 26 pages.
Extended European Search Report in European Appln. No. 21804483.2, dated Sep. 8, 2023, 12 pages.
Vivo, "Discussion on UE capabilities for NR positioning," 3GPP TSG RAN WG1 #99, R1-1912048, Reno, USA, Nov. 18-22, 2019, 4 pages.

\* cited by examiner

METHOD FOR TRANSMITTING AND RECEIVING SIGNAL IN WIRELESS COMMUNICATION SYSTEM, AND APPARATUS FOR SUPPORTING SAME

CROSS-REFERENCE TO RELATED APPLICATIONS

This application is a continuation of International Application No. PCT/KR2021/005941, filed on May 12, 2021, which claims the benefit of Korean Application No. 10-2020-0056702, filed on May 12, 2020. The disclosures of the prior applications are incorporated by reference in their entirety.

TECHNICAL FIELD

Various embodiments relate to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

Various embodiments may provide a method and apparatus for transmitting and receiving a signal in a wireless communication system.

Various embodiments may provide a positioning method in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Various embodiments may provide a method of transmitting and receiving a signal in a wireless communication system and apparatus for supporting the same.

According to various embodiments, a method performed by a user equipment (UE) in a wireless communication system may be provided.

According to various embodiments, the may include receiving information related to Quasi co-located (QCL) between at least one downlink (DL) Reference signal (RS) resource and at least one RS resource for positioning, receiving the at least one RS resource for the positioning, and obtaining a compensation value for the positioning based on that a first RS resource obtained from the at least one RS resource for the positioning is different from a second RS resource based on the information related to QCL and a quality measurement value related to each of the at least one DL RS.

According to various embodiments, the second RS resource may be obtained from the at least one RS resource for the positioning based on a propagation time related to each of the at least one DL RS resource.

According to various embodiments, the method may further include reporting a measurement value related to the positioning.

According to various embodiments, for the measurement value related to the positioning, one or more of (i) the measurement value related to the positioning is obtained based on the compensation value being applied to the measurement value related to the positioning for the first RS resource, or (ii) the measurement value related to the positioning comprising the measurement value related to the positioning for the first RS resource and the compensation value, may be satisfied According to various embodiments, the compensation value may be acquired based on a difference between the measurement value related to the positioning for the first RS resource and an estimated measurement value related to the positioning for the second RS resource.

According to various embodiments, the first RS resource may be an RS resource corresponding to a maximum RSRP among the at least one RS resource for the positioning.

According to various embodiments, the second RS resource may be an RS resource corresponding to a minimum propagation time among the at least one RS for the positioning.

According to various embodiments, the compensation value may be acquired based on that (i) the first RS resource is different from the second RS resource and that (ii) a configuration related to a reception beam change operation is not received.

According to various embodiments, instead of obtaining the compensation value based on that (i) the first RS resource is different from the second RS resource and that (ii) a configuration related to the reception beam change operation is received, the second RS resource may be acquired based on a different QCL type-D configuration from a QCL type-D configuration obtained from the information related to the QCL.

According to various embodiments, the QCL type-D configuration obtained from the information related to the QCL may be related to data communication.

According to various embodiments, a different QCL type-D configuration from the QCL type-D configuration obtained from the information related to the QCL may be related to the positioning.

According to various embodiments, the quality measurement value may be at least one of: reference signal received power (RSRP), signal-to-interference-plus-noise ratio (SINK), or signal-to-noise ratio (SNR).

According to various embodiments, a user equipment (UE) configured to operate in a wireless communication system may be provided.

According to various embodiments, the UE may include a transceiver, and at least one processor coupled with the transceiver.

According to various embodiments, the one or more processors may be configured to receive information related to Quasi co-located (QCL) between at least one downlink (DL) Reference signal (RS) resource and at least one RS resource for positioning, receive the at least one RS resource for the positioning, and obtain a compensation value for the positioning based on that a first RS resource obtained from the at least one RS resource for the positioning is different from a second RS resource based on the information related to QCL and a quality measurement value related to each of the at least one DL RS.

According to various embodiments, the second RS resource may be obtained from the at least one RS resource for the positioning based on a propagation time related to each of the at least one DL RS resource.

According to various embodiments, the one or more processors may be configured to report a measurement value related to the positioning.

According to various embodiments, for the measurement value related to the positioning, one or more of (i) the measurement value related to the positioning is obtained based on the compensation value being applied to the measurement value related to the positioning for the first RS resource; or (ii) the measurement value related to the positioning comprising the measurement value related to the positioning for the first RS resource and the compensation value, may be satisfied.

According to various embodiments, the first RS resource may be an RS resource corresponding to a maximum RSRP among the at least one RS resource for the positioning.

According to various embodiments, the second RS resource may be an RS resource corresponding to a minimum propagation time among the at least one RS for the positioning.

According to various embodiments, the at least one processor may be configured to communicate with at least one of a UE, a network, and an autonomous vehicle other than a vehicle in which the UE is included.

According to various embodiments, a method performed by a base station in a wireless communication system may be provided.

According to various embodiments, the method may include transmitting information related to Quasi co-located (QCL) between at least one downlink (DL) Reference signal (RS) resource and at least one RS resource for positioning, transmitting the at least one RS resource for the positioning, and obtaining a measurement value for the positioning related to a compensation value for the positioning based on that a first RS resource is different from a second RS resource.

According to various embodiments, the first RS resource may be obtained from the at least one RS resource for the positioning based on the information related to the QCL and a quality measurement value related to each of the at least one DL RS.

According to various embodiments, the second RS resource may be obtained from the at least one RS resource for the positioning based on a propagation time related to each of the at least one DL RS resource.

According to various embodiments, a base station operating in a wireless communication system may be provided.

According to various embodiments, the base station may include a transceiver, and at least one processor coupled with the transceiver.

According to various embodiments, the one or more processors may be configured to transmit information related to Quasi co-located (QCL) between at least one downlink (DL) Reference signal (RS) resource and at least one RS resource for positioning, transmit the at least one RS resource for the positioning, and obtain a measurement value for the positioning related to a compensation value for the positioning based on that a first RS resource is different from a second RS resource.

According to various embodiments, the first RS resource may be obtained from the at least one RS resource for the positioning based on the information related to the QCL and a quality measurement value related to each of the at least one DL RS.

According to various embodiments, the second RS resource is obtained from the at least one RS resource for the positioning based on a propagation time related to each of the at least one DL RS resource.

According to various embodiments, an apparatus operating in a wireless communication system may be provided.

According to various embodiments, the apparatus may include at least one processor, and at least one memory storing at least one instruction to cause the at least one processor perform a method.

According to various embodiments, the operation may include receiving information related to Quasi co-located (QCL) between at least one downlink (DL) Reference signal (RS) resource and at least one RS resource for positioning, receiving the at least one RS resource for the positioning, and obtaining a compensation value for the positioning based on that a first RS resource obtained from the at least one RS resource for the positioning is different from a second RS resource based on the information related to QCL and a quality measurement value related to each of the at least one DL RS.

According to various embodiments, the second RS resource may be obtained from the at least one RS resource for the positioning based on a propagation time related to each of the at least one DL RS resource.

According to various embodiments, a processor-readable medium storing at least one instruction to cause at least one processor to perform a method may be provided.

According to various embodiments, the method may include receiving information related to Quasi co-located (QCL) between at least one downlink (DL) Reference signal (RS) resource and at least one RS resource for positioning, receiving the at least one RS resource for the positioning, and obtaining a compensation value for the positioning based on that a first RS resource obtained from the at least one RS resource for the positioning is different from a second RS resource based on the information related to QCL and a quality measurement value related to each of the at least one DL RS.

According to various embodiments, the second RS resource may be obtained from the at least one RS resource for the positioning based on a propagation time related to each of the at least one DL RS resource.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

According to various embodiments, a signal may be effectively transmitted and received in a wireless communication system.

According to various embodiments, positioning may be effectively performed in a wireless communication system.

According to various embodiments, a beam for data communication and a beam for positioning may be separately provided.

According to various embodiments, positioning accuracy may be improved.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE.

3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
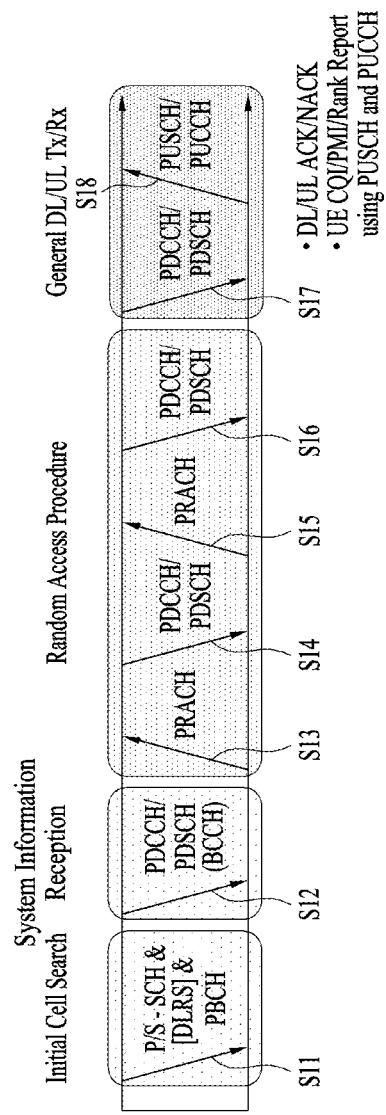
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S110. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
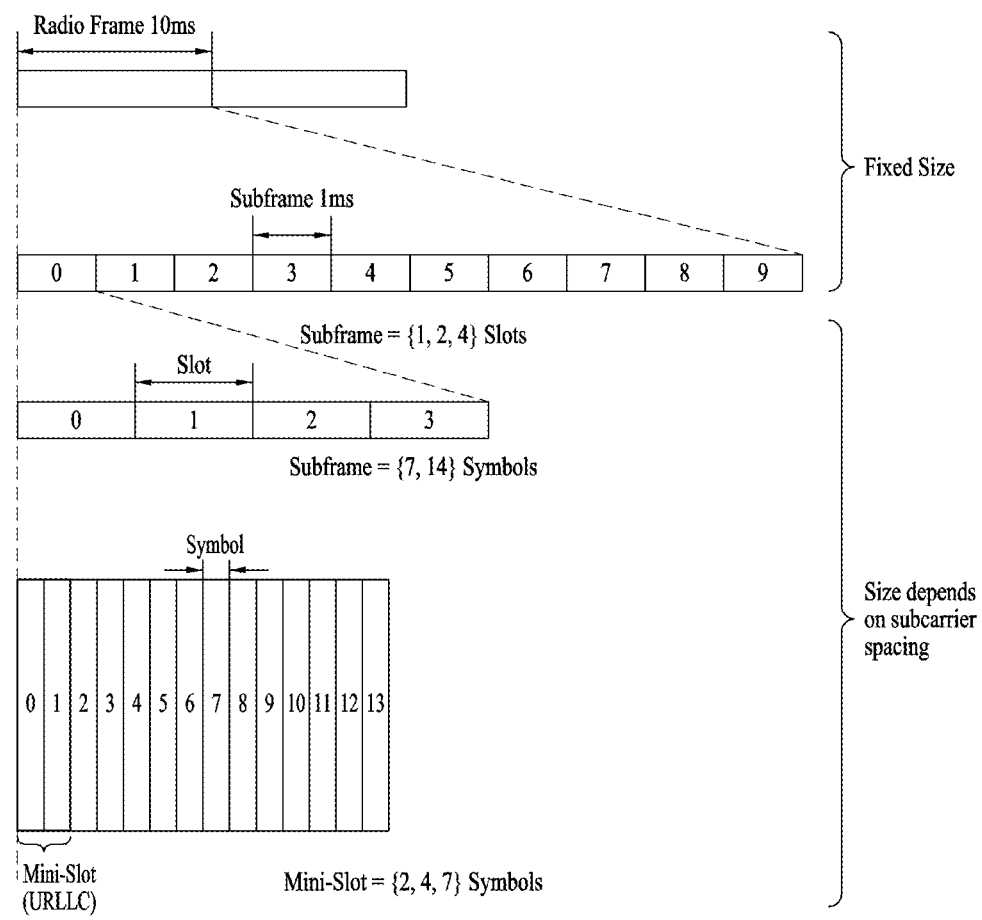
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), μ and a CP are obtained from RRC parameters provided by the BS.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value Nf related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\Xi_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
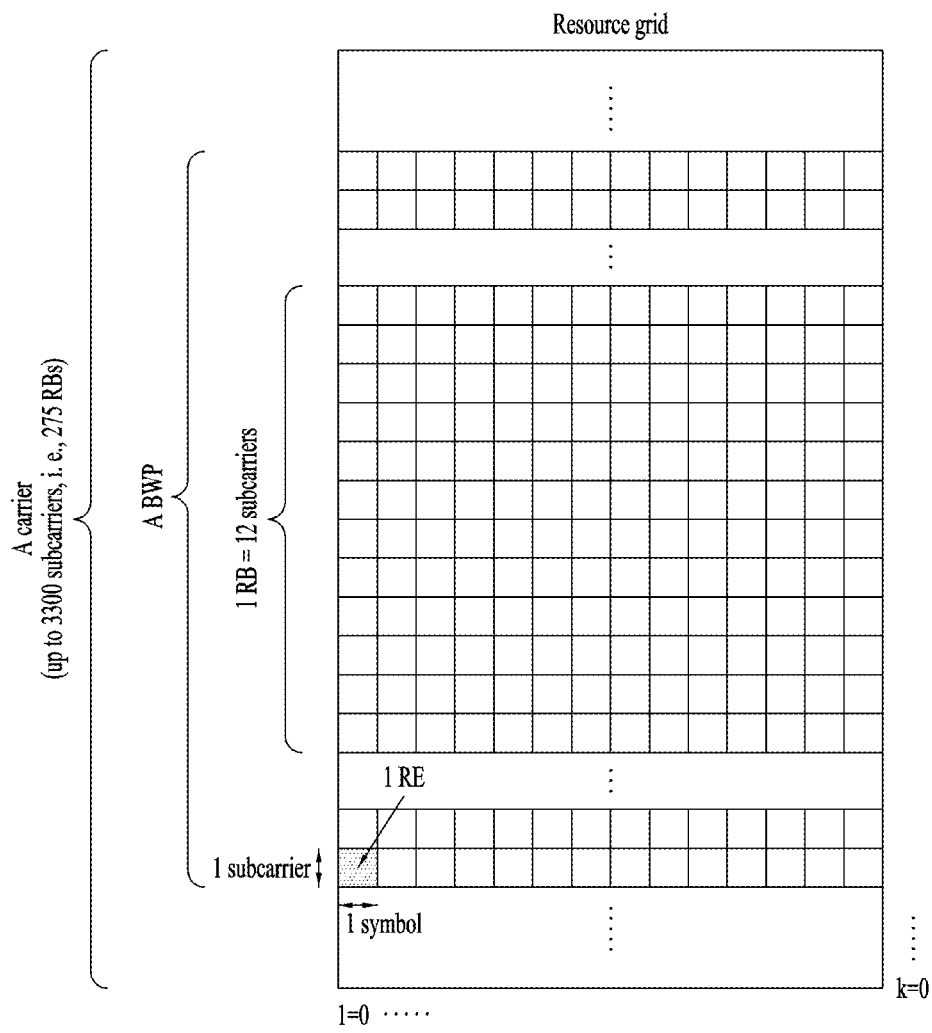
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^\mu$ OFDM symbols by $N^{size,\mu}_{grid} \times N^{RB}_{SC}$ subcarriers, where $N^{size,\mu}_{grid}$ is indicated by RRC signaling from the BS. $N^{size,\mu}_{grid}$ may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $a_{k,l}^{(p,\mu)}$. An RB is defined as $N^{RB}_{SC}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
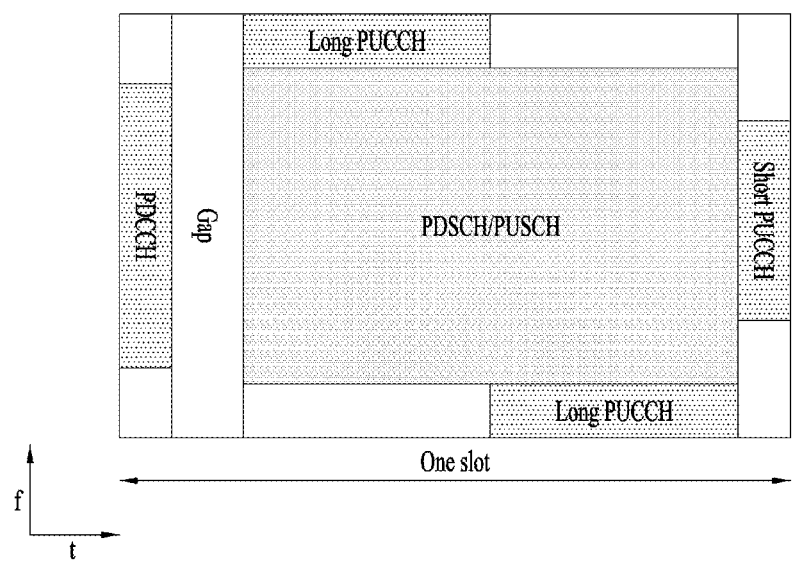
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. QCL (Quasi Co-located or Quasi Co-Location)

The UE may receive a list of up to M TCI-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'gcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol configuration

Figure 5:
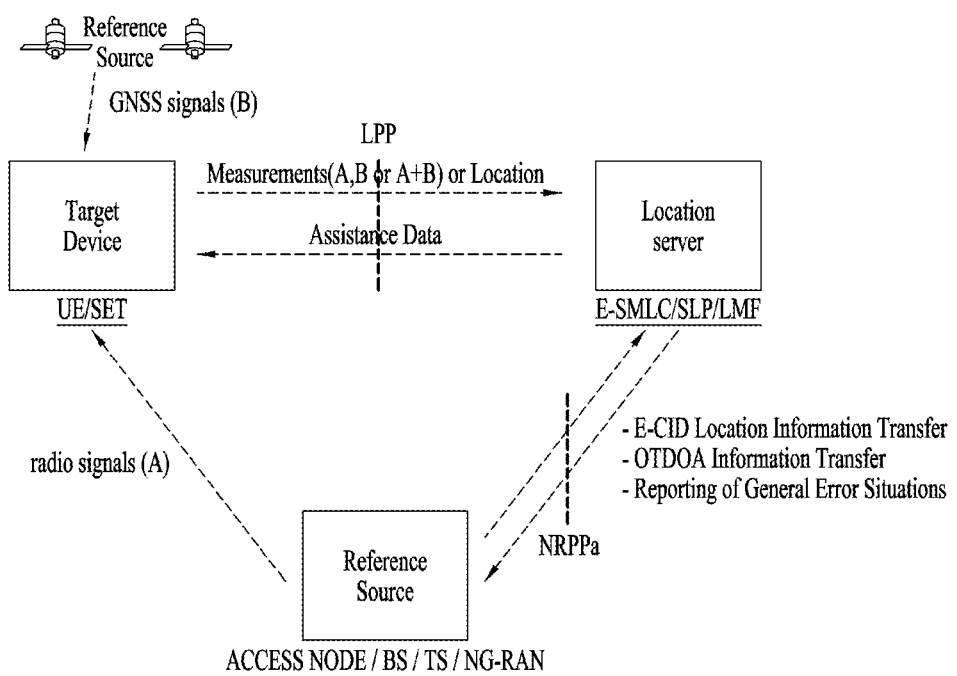
FIG. 5 is a diagram illustrating a positioning protocol configuration for positioning a user equipment (UE), to which various embodiments are applicable.

FIG. 5 is a diagram illustrating an exemplary positioning protocol configuration for positioning a UE, to which various embodiments are applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

$$c_{init} = \left(2^{22} \left\lfloor \frac{n_{ID,seq}^{PRS}}{1024} \right\rfloor \right) + \quad \text{[Equation 2]}$$

$$2^{10}(N_{symb}^{slot} n_{s,f}^{\mu} + l + 1)(2(n_{ID,seq}^{PRS} \bmod 1024) + 1) +$$

$$(n_{ID,seq}^{PRS} \bmod 1024)) \bmod 2^{31}$$

$n_{s,f}^{\mu}$ may be a slot number in a frame in an SCS configuration $\mu$. A DL PRS sequence ID $n_{ID,\,seq}^{PRS}$, $\in \{0,1,\ldots,4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs (k, l)$_{p,\mu}$, specifically by Equation 3. may represent an RE (k, l) for an antenna port p and the SCS configuration $\mu$.

$$a_{k,l}^{(p,\mu)} = \beta_{PRS} r(M)$$

$$k = mK_{comb}^{PRS} + ((k_{offset}^{PRS} + k'))$$

$$l = l_{start}^{PRS}, l_{start}^{PRS} + 1, \ldots, l_{start}^{PRS} + L_{PRS} - 1 \quad \text{[Equation 3]}$$

Herein, the following conditions may have to be satisfied:

The REs (k,l)$_{p,\,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition; $l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0,1,\ldots, K_{comb}^{PRS}-1\}$ may be given by combOffset. A frequency offset k' may be a function of $l-l_{start}^{PRS}$ as shown in Table 5.

TABLE 5

| | Symbol number within the downlink PRS resource $l$-$l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

Sequence Generation

A PRS sequence r(m) (m=0, 1, ...) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

c(i) may be a pseudo-random sequence. A pseudo-random sequence generator may be initialized by Equation 2.

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \mod 2^{\mu} T_{per}^{PRS} \in \quad \text{[Equation 4]}$$

$$\{iT_{gap}^{PRS}\}_{i=0}^{T_{rep}^{PRS}-1}$$

$N_{slot}^{frame,\ \mu}$ may be the number of slots per frame in the SCS configuration μ. $n_f$ may be a system frame number (SFN). $n_{s,f}^{\mu}$ may be a slot number in a frame in the SCS configuration μ.

A slot offset may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset A periodicity $T_{per}^{PRS} \in \{4,5, 8, 10, 16, 20, 32, 40, 64, 80, 160, 320, 640, 1280, 2560, 20, 10240\}$ may be given by a higher-layer parameter DL-PRS-Periodicity. A repetition factor $T_{rep}^{PRS} \in \{1, 2, 4, 6, 8, 16, 32\}$ may be given by a higher-layer parameter DL-PRS-ResourceRepetitionFactor. A muting repetition facto $T_{muting}^{PRS}$ may be given by a higher-layer parameter DL-PRS-MutingBitRepetitionFactor. A time gap $T_{gap}^{PRS} \in \{1, 2, 4, 8, 16, 32\}$ may be given by a higher-layer parameter DL-PRS-ResourceTimeGap.

2.3. UE Positioning Architecture

Figure 6:
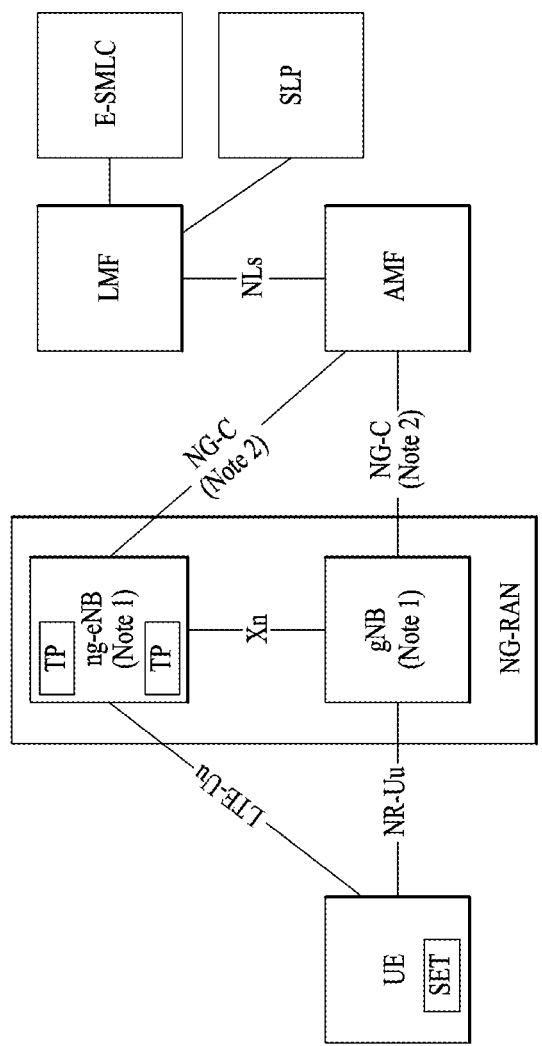
FIG. 6 illustrates an exemplary system architecture for measuring positioning of a UE to which various embodiments are applicable.

FIG. 6 illustrates an exemplary system architecture for measuring positioning of a UE to which various embodiments are applicable.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
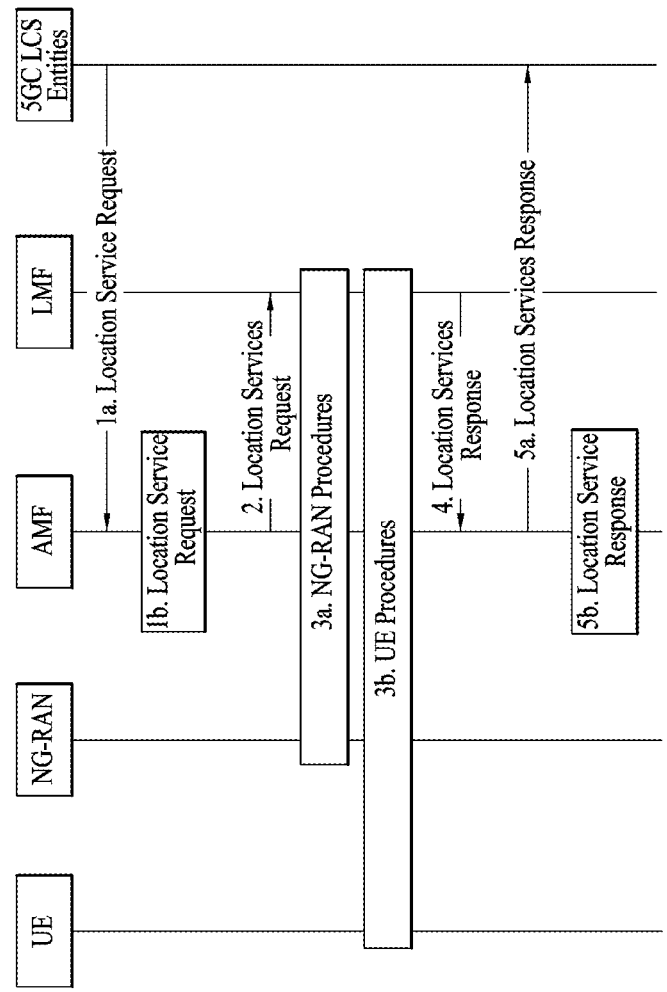
FIG. 7 illustrates an implementation example of a network for UE positioning.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIGS. 11A and 11B has been initiated by step 1b, the AMF may use the location service response in order to provide a location service related to an emergency call.

2.5. Positioning Protocol

LTE Positioning Protocol (LPP)

Figure 8:
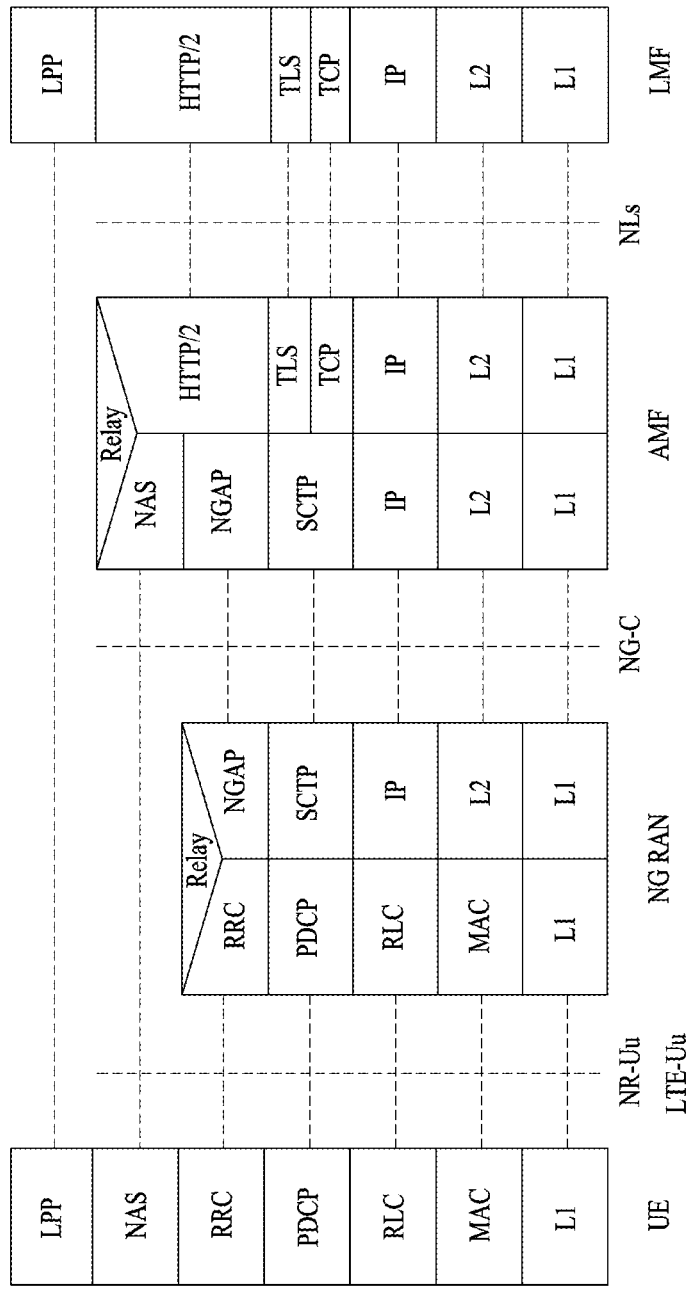
FIG. 8 is a diagram illustrating protocol layers for supporting LTE positioning protocol (LPP) message transmission, to which various embodiments are applicable.

FIG. 8 illustrates an exemplary protocol layer used to support LPP message transfer between an LMF and a UE. An LPP protocol data unit (PDU) may be carried in a NAS PDU between an AMF and the UE.

Referring to FIG. 8, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
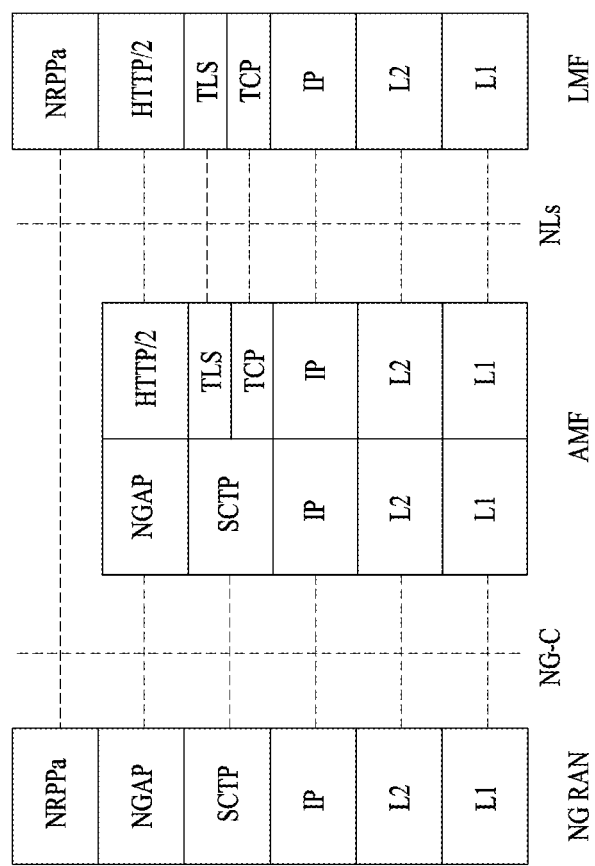
FIG. 9 is a diagram illustrating protocol layers for supporting NR positioning protocol a (NRPPa) protocol data unit (PDU) transmission, to which various embodiments are applicable.

FIG. 9 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

Figure 10:
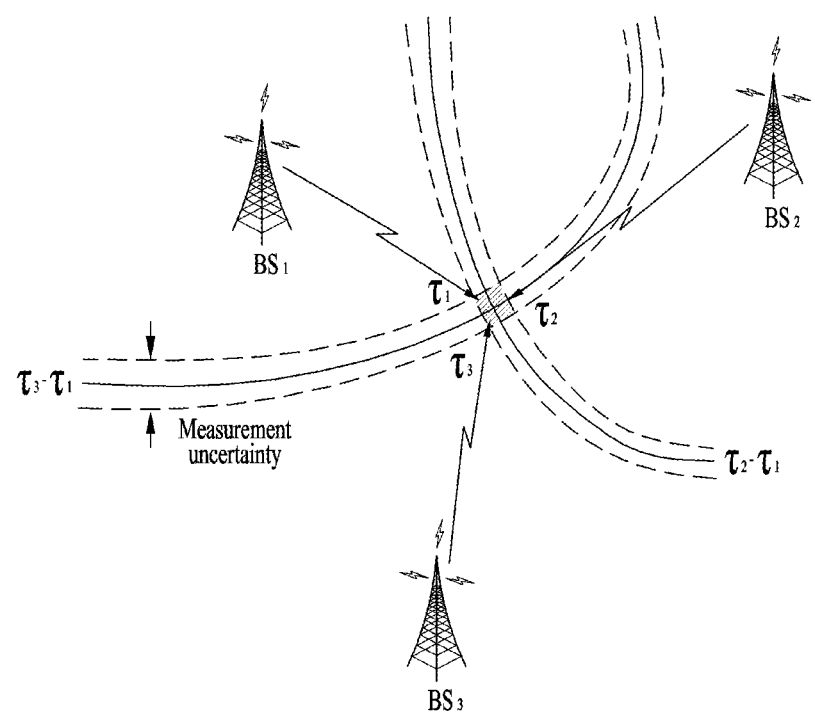
FIG. 10 is a diagram illustrating an observed time difference of arrival (OTDOA) positioning method, to which various embodiments are applicable.

FIG. 10 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or B Ss. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

[Equation 5]

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i\text{-}T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-cell RTT)

Figure 11A:
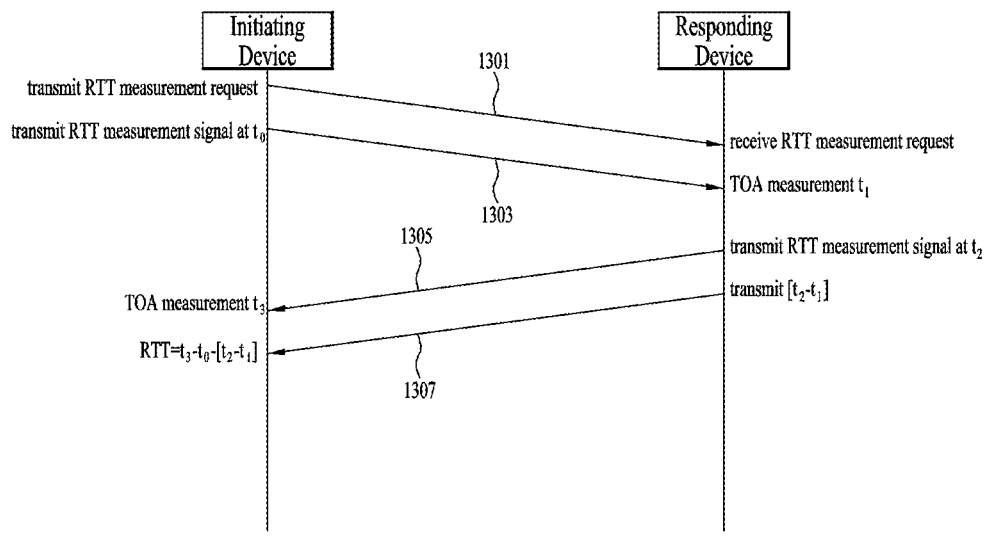
FIGS. 11A and 11B are diagrams illustrating a multi-round trip time (multi-RTT) positioning method to which various embodiments are applicable.
Figure 11B:
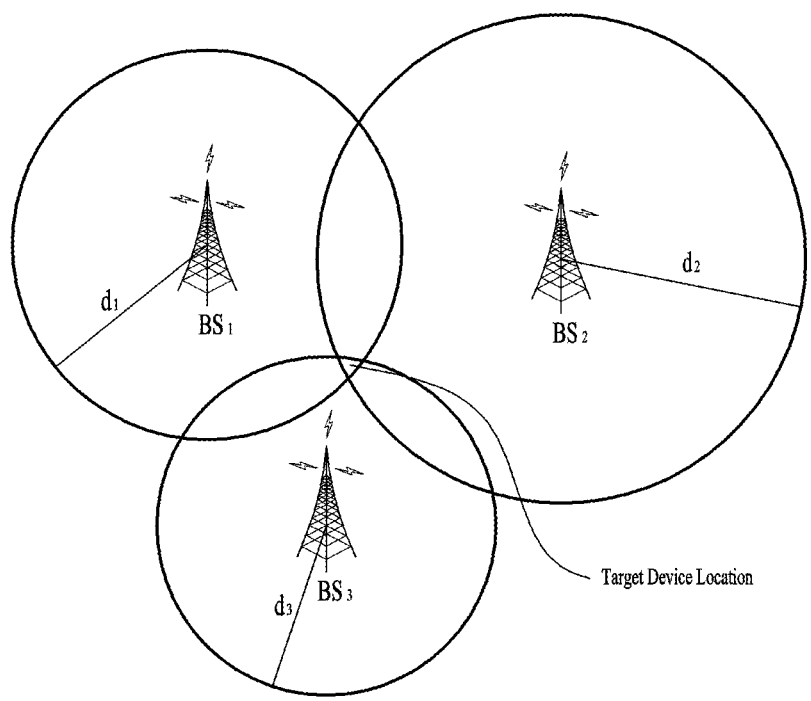

FIGS. 11A and 11B are diagrams illustrating an exemplary multi-round trip time (multi-RTT) positioning method to which various embodiments are applicable.

Referring to FIG. 11A, an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2-t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 11B, an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 6 shows an exemplary SRS request field.

TABLE 6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $1^{st}$ set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

TABLE 6-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| | by SRS-PosResourceSet with an entry in aperiodicSRS-ResourceTriggerList set to 3 when triggered by DCI formats 0_1, 0_2, 1_1, and 1_2 | |

In Table 6 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
CSI-RS: channel state information reference signal
L1: layer 1
LMF: location management function
NRPPa: NR positioning protocol a
OTDOA (OTDoA): observed time difference of arrival
PRS: positioning reference signal
RS: reference signal
RTT: round trip time
RSRP: reference signal received power
RSRQ: reference signal received quality
RSTD: reference signal time difference/relative signal time difference
Rx-Tx time difference: receive-transmit time difference
  1) UE Rx-Tx time difference: According to various embodiments, the UE Rx-Tx time difference may be defined as $T_{UE-RX}-T_{UE-TX}$. According to various embodiments, $T_{UE-RX}$ may be a UE received timing of a DL subframe (and/or a frame/slot/symbol) #i from a positioning node and may be defined by a first detected path in time. According to various embodiments, $T_{UE-TX}$ may be a UE transmit timing of a UL subframe (and/or a frame/slot/symbol) #j that is closest to a subframe (and/or a frame/slot/symbol) #i in time received from the positioning node (#i, #j: indexes, each of which may have an integer value greater than or equal to 0).). According to various embodiments, one or more DL PRS resources may be used to determine start of one subframe (and/or a frame/slot/symbol) of a first arrival path of the positioning node.

2) gNB Rx-Tx time difference: According to various embodiments, the gNB Rx-Tx time difference may be defined as $T_{gNB-RX}-T_{gNB-TX}$. According to various embodiments, $T_{gNB-RX}$ may be a positioning node received timing of a UL subframe (and/or a frame/slot/symbol) #i including a sounding reference signal (SRS) associated with a UE and may be defined by a first detected path in time. According to various embodiments, $T_{gNB-TX}$ may be a positioning node transmit timing of a DL subframe (and/or a frame/slot/symbol) #j that is closest from a subframe (and/or a frame/slot/symbol) #j that is closest to a subframe (and/or a frame/slot/symbol) #i in time received from a UE (#i, #j: indexes, each of which may have an integer value greater than or equal to 0).). One or more SRS resources for positioning may be used to determining start of one subframe (and/or a frame/slot/symbol). According to various embodiments, a gNB may be replaced with an eNB/base station (BS)/TRP, or the like.

SINR: signal to interference plus noise ratio)
SNR: signal to noise ratio
SRS: sounding reference signal
SS: synchronization signal
SSB: synchronization signal block
SS/PBCH: synchronization signal/physical broadcast channel
TDOA (TDoA): timing difference of arrival
TOA (ToA): time of arrival
TOF (ToF): time of flight
TRP: transmission and reception point (TP: transmission point)
Tx: transmit/transmission, Rx: receive/reception
UTDOA (UTDoA): uplink time difference of arrival In a description of various embodiments, a base station (BS) may be understood as a generic term including a remote radio head (RRH), an eNB, a gNB, a TP, a reception point (RP), a relay, and the like.

In the description of various embodiments, the expression 'greater than/above A' may be replaced with the expression 'above/greater than A'.

In the description of various embodiments, the expression 'less than/below B' may be replaced with the expression 'below/less than B'.

Various embodiments may relate to a beam between transmission and reception nodes suitable for timing measurement acquisition and/or reporting.

For example, in order to improve positioning accuracy, timing measurement accuracy may be considered as a critical factor for a positioning technology such as DL-TDOA, UL-TDOA, and Multi-RTT. For example, a frequency bandwidth resource may be the most dominant factor related to timing measurement accuracy. For example, there is a need to discuss a method of using frequency resources more efficiently in consideration of carrier aggregation (CA), E-UTRA New Radio-Dual Connectivity (EN-DC), and supplementary uplink (SUL).

For example, a transmission beam and a reception beam in a cell/BS/TRP and a UE need to be discussed. For example, a beam management framework of a wireless communication system of Release-16 or lower to which various embodiments are applicable may be for effective data communication rather than for supporting effective positioning. For example, the UE may be indicated to perform RSRP measurement for SSB and/or CSI-RS resources and/or report RSRP together with an index/identifier (ID). For example, the BS may know the best beam direction for data transmission to the UE based on the reported information. However, for example, the best beam direction for data transmission may not be the best beam direction for positioning.

For example, the reception/transmission beam configuration (beam management) of the UE based on a QCL type D, spatial relation information, etc. of a wireless communication system of Release-16 or lower to which various embodiments are applicable, may configure the transmission/reception beam for effective data communication. For example, the transmission/reception beam pair may be configured/indicated in a direction in which the strength of a reception signal (e.g., RSRP, SINK, SNR, etc.) is largest. However, for example, from a UE positioning point of view, it is not guaranteed that the transmission/reception beam pair in the direction having the largest received signal strength is a beam pair in a LoS direction, and thus a beam pair having the largest received signal strength may not be regarded as the best beam pair.

Various embodiments may relate to transmission/reception beam optimization for UE positioning estimation.

Various embodiments may relate to operations of a UE and a network when a transmission/reception beam between the UE and a BS is not suitable for obtaining and reporting optimal timing measurement.

Various embodiments may relate to use of a transmission/reception beam between a UE/BS optimized for UE positioning. For example, beam management for data communication and beam management for positioning may be performed separately (in parallel). For example, when the beam for data communication is not in a LoS direction, the UE may request a change of a reception beam (QCL type-D) and/or a transmission beam (spatial relation information). And/or, for example, since loss in the LoS direction (e.g., penetration loss) is greater than a predetermined level, the UE needs to increase the size of transmission power for SRS transmission, and thus the UE may also request a change in the path-loss reference RS in a direction in which a propagation time is minimized. And/or, for example, the UE may measure/store propagation time measurement for a DL RS resource to compensate for a measurement error that may occur when a beam other than the LoS direction is used.

Unless otherwise specifically stated, in the description of various embodiments, a network may be a BS/location server/LMF or the like.

Unless otherwise specifically stated, in the description of various embodiments, an operation of the UE may be configured/indicated by the BS/location server/LMF, or may be performed as a default operation without explicit configuration.

Unless otherwise specifically stated, in the description of various embodiments, the timing measurement may be measurement of a ToA, a ToF, a propagation time for an $n^{th}$ arrival signal path, a RSTD, and a UE reception-transmission time difference, and measurement of a BS reception-transmission time difference.

Various embodiments to be described below have been described in terms of determination/configuration/indication of transmission/reception beams between the cell/BS/TRP and the UE. However, various embodiments relate to configuration/determination of a beam between transmission/reception nodes to best measure the first arrival signal path, and thus the various embodiments may also be used to determine a transmission/reception beam between UEs that transmit and receive a specific signal (e.g., an RS) for not only transmission/reception beam configuration between the cell/BS/TRP and the UE but also timing measurement measurement/acquisition.

Figure 12:
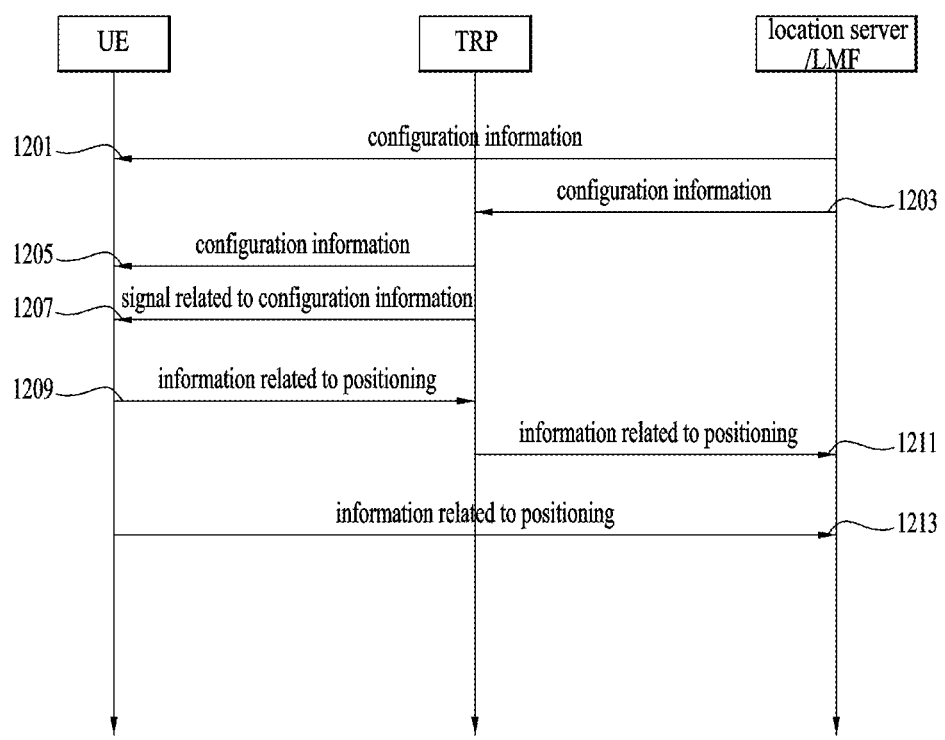
FIG. 12 is a simplified diagram illustrating a method of operating a UE, a transmission and reception point (TRP), a location server, and/or a location management function (LMF) according to various embodiments.

FIG. 12 is a simplified diagram illustrating an operating method of a UE, a TRP, a location server, and/or an LMF according to various embodiments.

Referring to FIG. 12, in operation 1201 according to various embodiments, the location server and/or the LMF may transmit configuration indicated to the UE and the UE may receive the configuration information.

In operation 1203 according to various embodiments, the location server and/or the LMF may transmit reference configuration information to the TRP and the TRP may receive the reference configuration information. In operation 1205 according to various embodiments, the TRP may transmit the reference configuration information to the UE and the UE may receive the reference configuration information. In this case, operation 1501 according to various embodiments may be omitted.

In contrast, operations 1203 and 1205 according to various embodiments may be omitted. In this case, operation 1201 according to various embodiments may be performed.

That is, operation 1201 according to various embodiments, and operations 1503 and 1505 according to various embodiments may be selectively performed.

In operation 1207 according to various embodiments, the TRP may transmit a signal related to the configuration information and the UE may receive the signal related to the configuration information. For example, the signal related to the configuration information may be a signal for positioning of the UE.

In operation 1209 according to various embodiments, the UE may transmit a signal related to positioning to the TRP and the TRP may receive the signal related to positioning. In operation 1211 according to various embodiments, the TRP may transmit the signal related to positioning to the location server and/or the LMF and the location server and/or the LMF may receive the signal related to positioning.

In operation 1213 according to various embodiments, the UE may transmit the signal related to positioning to the location server and/or the LMF and the location server and/or the LMF may receive the signal related to positioning. In this case, operations 1209 and 1211 according to various embodiments may be omitted.

In contrast, operation 1213 according to various embodiments may be omitted. In this case, operations 1209 and 1511 according to various embodiments may be performed.

That is, operations 1209 and 1211 according to various embodiments, and operation 1513 according to various embodiments may be selectively performed.

According to various embodiments, the signal related to positioning may be obtained based on the configuration information and/or the signal related to the configuration information.

Figure 13:
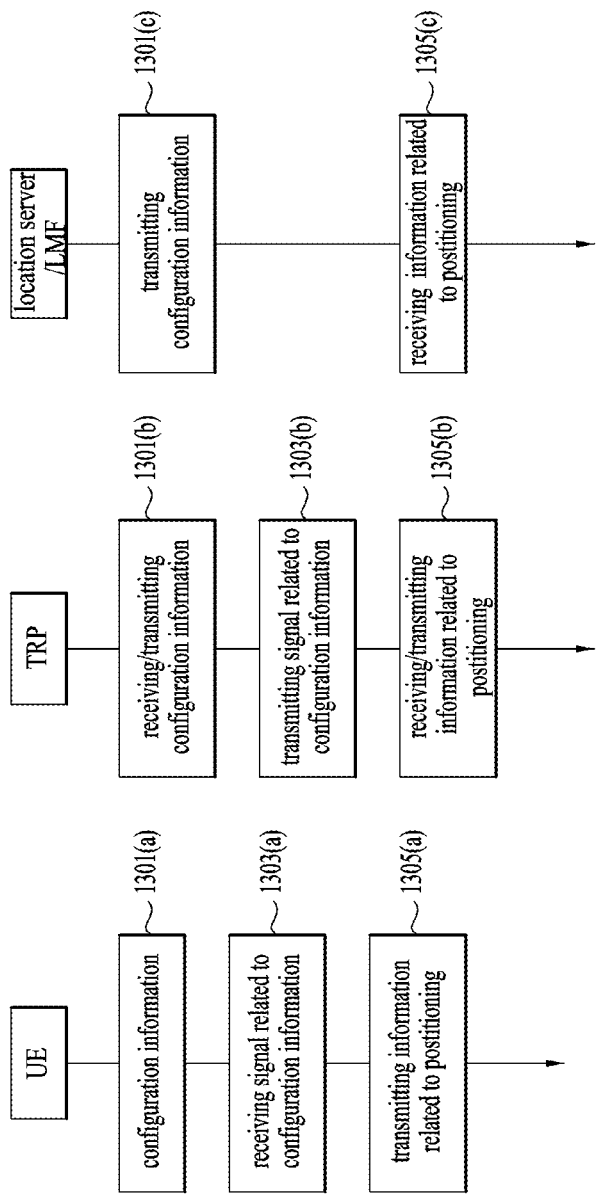
FIGS. 13A to 13C are simplified diagrams illustrating a method of operating a UE, a TRP, a location server, and/or an LMF according to various embodiments.

FIGS. 13A to 13C are simplified diagrams illustrating an operating method of a UE, a TRP, a location server, and/or an LMF according to various embodiments.

Referring to FIG. 13A, in operation 1301(a) according to various embodiments, the UE may receive configuration information.

In operation 1303(a) according to various embodiments, the UE may receive a signal related to the configuration information.

In operation 1305(a) according to various embodiments, the UE may transmit information related to positioning.

Referring to FIG. 13B, in operation 1301(b) according to various embodiments, the TRP may receive configuration information from the location server and/or the LMF and transmit the configuration information to the UE.

In operation 1303(b) according to various embodiments, the TRP may transmit a signal related to the configuration information.

In operation 1305(b) according to various embodiments, the TRP may receive information related to positioning and transmit the information related to positioning to the location server and/or the LMF.

Referring to FIG. 13C, in operation 1301(c) according to various embodiments, the location server and/or the LMF may transmit configuration information.

In operation 1305(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Potential Enhancement on Transmission and/or Reception beam management to effectively estimate UE's location In the description of various embodiments, an effect of the transmission/reception beam direction of the BS and the UE on UE positioning is explained, and a method for more accurately estimating/recognizing the location of the UE is described.

Background and Motivation

For example, a configuration of QCL type-D and spatial relation information may be in a direction suitable for data communication but may not be a beam direction optimized for UE location measurement.

For example, a beam management framework between a UE and a BS is designed for data transmission and reception. For example, the UE may perform measurement of an RSRP/SNR/SINR for several CSI-RS resources and may report a CSI-RS resource index/ID (e.g., CSI-RS resource indicator (CRI)) and a corresponding RSRP value to the BS.

For example, it may be seen that the BS recognizes which transmission beam is used to receive a signal with the best beam gain by the UE. However, it may be difficult for the BS to know which transmission/reception beam to use to best receive and/or detect and/or detect a first arrival signal path by the UE. This may be because the UE does not report beam information based on a propagation time for a beam configured/transmitted/shown by the BS. For example, it may be difficult to see that a beam configured/indicated based on an RSRP/SINR/SNR is a beam optimized for propagation time measurement. It can be briefly summarized as follows.

Downlink (UE) For example, the reception beam used by the UE through QCL type D indicated/configured by the BS/location server/LMF may be a reception beam of an RSRP maximum direction, but may not be in a beam direction for ensuring a minimum propagation time for the first arrival signal path.

(BS) For example, a transmission beam used by a cell/BS/TRP corresponding to a reception beam used by the UE using QCL type D configured by the UE may not be an optimal reception beam for measuring the first arrival signal path.

Uplink (UE) For example, the transmission beam used by the UE through spatial relation information indicated/configured by the BS/location server/LMF may be a transmission beam of an RSRP maximum direction, but may not be in a beam direction for ensuring a minimum propagation time for the first arrival signal path.

(BS) For example, a beam direction in which the cell/BS/TRP performs reception through a spatial relation information configuration of the UE may not be an optimal reception beam direction for measuring a propagation time for a first arrival signal path.

Figure 14:
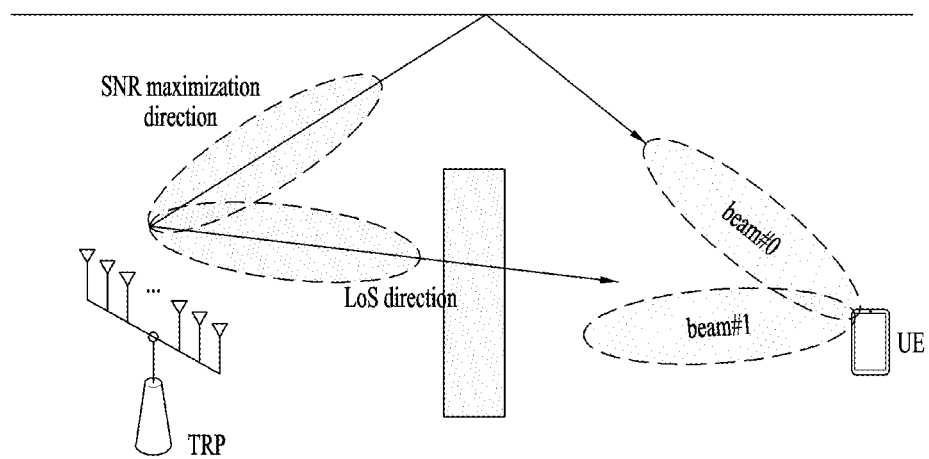
FIG. 14 shows an example of multi-path signal transmission/reception which is applicable to Various embodiments.

FIG. 14 shows an example of multi-path signal transmission/reception to which various embodiments are applicable.

For example, a signal transmitted by a transmitting node (e.g., TRP/BS/UE) may be transmitted in a line of sight (LoS) path, but may collide with various objects/buildings/scatters and may be reflected and transmitted/arrived in a multi-path. For example, a beam corresponding to the best measurement value related to reception quality of an RSRP/SNR/SINR may not be a beam corresponding to the LoS path, which means that a beam suitable for data transmission and reception is not a beam suitable for positioning.

In consideration of this, in the description of various embodiments, the first arrival signal path may mean (a path of) a signal that first arrives at the receiving node among signals transmitted in several paths. For example, when a LoS is ensured between transmitting and receiving nodes, the first arrival signal path may be the LoS path.

For example, in the description of various embodiments, a beam suitable for data transmission and reception may be a beam corresponding to the best measurement value related to reception quality of an RSRP/SNR/SINR. For example, in the description of various embodiments, a beam suitable for positioning may be a beam corresponding to a LoS and/or a minimum propagation time.

Proposal #1: Separate beam management/reporting depending on purposes: beam for positioning/beam for data communication According to various embodiments, management of a beam of the UE and BS suitable for UE positioning and management of a transmission/reception beam of the UE and BS suitable for transmitting and receiving data may be operated separately. According to various embodiments, the UE may be configured/indicated by distinguishing between a transmission/reception beam suitable for positioning and beam information suitable for data transmission/reception. According to various embodiments, the UE may report beam information and beam quality suitable for data transmission/reception and may be indicated/configured to classify/separately report beam information and beam quality suitable for UE positioning.

According to various embodiments, the UE may be indicated/configured to report a more suitable/reciprocal beam for data communication based on the entire desired signal power of an RSRP, an (L1-)SINR, an SNR, and the like from a network (e.g., a B S/location server/LMF).

According to various embodiments, the UE may be configured/indicated to report a transmission/reception beam suitable for timing measurement based on a k-th ($k^{th(k>0)}$) arrival signal path.

For example, the UE may be configured/indicated to perform measurement for a specific DL RS, to report an RS resource set and/or RS resource information corresponding to N (>0)-best (top N) in terms of an RSRP/SINR/SNR (e.g., a resource set ID and/or resource ID, and in the description of various embodiments, the RS resource set may be a set including at least one RS), and to report an RS resource set and/or RS resource information corresponding to N-best in terms of a propagation time of the first arrival signal path.

For example, the BS may provide BS/TRP transmission/reception beam information suitable for positioning and transmission/reception beam information of the UE to the location server/LMF. And/or, for example, from the location server/LMF, the UE may request information on a reception beam direction suitable for receiving a specific positioning RS resource from the BS.

According to various embodiments, the BS may configure/indicate different beam reporting criteria to the UE:
Reporting criterion of UE
RSRP/SINR/SNR/RSSI (Received signal strength indication)
Propagation time of the n-th arrival signal path (+signal strength). Propagation time and/or signal intensity of $n^{th}$ arrival signal path
[Reporting contents of UE]
Reporting of (physical) TRP/Cell ID +RS resource (SSB index/CSI-RS/PRS resource ID) +RSRP +propagation time (for the n-th arrival signal path). Physical cell/BS/TRP ID and/or RS resource (SSB index and/or CSI-RS resource ID and/or PRS resource ID) and/or RSRP and/or propagation time of ($n^{th}$ arrival signal path)

According to various embodiments, when QCL type-D is configured for the RX beam configuration to be used when receiving the PRS to the UE, an RS resource more suitable for positioning may be configured. For example, when a beam suitable for data transmission and reception and a beam suitable for positioning are separately operated, if QCL type-D is configured for a RX beam configuration to be used when receiving PRS to the UE, a beam suitable for positioning may be used.

According to various embodiments, during a spatial relation information configuration for a TX beam configuration to be used when the UE transmits a UL RS for positioning, an RS resource more suitable for positioning may be configured when spatial relation information is configured. For example, when a beam suitable for data transmission and reception and a beam suitable for positioning are separately operated, a beam suitable for positioning may be used in the case of the spatial relation information configuration for a TX beam configuration to be used when the UE transmits a UL RS for positioning.

Proposal #2: TX/RX beam change request to use optimized beam for positioning

According to various embodiments, prior to receiving the configured beam direction and/or beam configuration, the UE may request the B S/location server/LMF to change/configure transmission/reception beam and specific BS/TRP transmission/reception beam of the UE suitable for positioning. According to various embodiments, the beam change request may be a request for configuration/change to a beam more suitable for UE positioning, for example, changing the beam to obtain optimal timing measurement. For example, the beam change request may be a request to change a path-loss reference.

RS information and/or cell/BS/TRP information configured with QCL type-D
RS information and/or cell/BS/TRP information configured with spatial relation information
Path-loss reference RS and/or cell/BS/TRP information for power control According to various embodiments, the UE may request the BS/location server/LMF to change a reception beam of a specific DL PRS resource configured from the BS/location server/LMF and/or a transmission beam of an SRS for positioning resource from the BS/location server/LMF.

For example, in the case of an OTDOA scheme, an operation of the UE may be limitedly performed with respect to a reference cell/BS/TRP. For example, this may be because the quality of timing measurement for the reference cell/BS/TRP affects all RSTD measurements obtained based on the reference cell/BS/TRP.

For example, the UE may be configured/indicated with reference configuration information related to a DL PRS resource to be used as a reference for measurement of a DL RSTD and/or a DL-PRS-RSRP and/or a UE reception-transmission time difference from a network. For example, information provided from reference configuration information may include a list (reference PRS resource ID) of a cell/BS/TRP ID (reference cell/BS/TRP ID) and/or DL a PRS resource set ID and/or one PRS resource ID and/or a DL PRS resource ID. According to various embodiments, the highest priority may be given to a reference cell/BS/TRP and/or a reference PRS resource set and/or a reference PRS resource that respectively correspond to a reference cell/BS/TRP ID and/or a reference PRS resource set ID and/or a reference PRS resource ID, included in information provided from the reference configuration information. For example, the UE may use the information provided from the reference configuration information and/or (in the case of a DL PRS resource included in one DL PRS resource set), a different DL PRS resource set ID and/or a different DL PRS resource (and/or a cell/BS/TRP ID) from the information provided from the reference configuration information may be used/determined as a reference.

For example, the reference may be configured/indicated based on an information element (IE) according to Table 7 below. For example, information corresponding to a reference cell/BS/TRP may be a dl-PRS-ID.

ment value for a specific DL RS resource (e.g., an SSB, a PRS resource, or a CSI-RS resource) configured with QCL type D of a DL PRS resource and/or spatial relation information of an SRS resource is different from a propagation time/ToA value owned by the UE for the specific cell/BS/TRP by a predetermined level (e.g., a threshold value) or

TABLE 7

```
-     DL-PRS-ID-info
The IE DL-PRS-ID-info provides the IDs of the reference TRPs'DL-PRS Resources.
-- ASN1START
DL-PRS-ID-Info-r16 ::= SEQUENCE {
    dl-PRS-ID-r16                      INTEGER (0..255),
    nr-DL-PRS-ResourceID-List-r16      SEQUENCE (SIZE (1..nrMaxResourceIDs-r16)) OF
                                                     NR-DL-PRS-ResourceID-r16
        OPTIONAL,
    nr-DL-PRS-ResourceSetID-r16        NR-DL-PRS-ResourceSetID-r16
    OPTIONAL
}
-- ASN1STOP
dl-PRS-ID
This field is used along with a DL-PRS Resource Set ID and a DL-PRS Resources ID to uniquely identify a DL-PRS
Resource. This ID can be associated with multiple DL-PRS Resource Sets associated with a single TRP.
Each TRP should only be associated with one such ID.
```

According to various embodiments, the UE may perform measurement a propagation time for the DL RS and may store the measured propagation time while performing measurement of an RSRP/SNR/SINR for a DL RS (e.g., an SSB, or a DL PRS) resource transmitted by a specific cell/BS/TRP. Therefore, According to various embodiments, the UE may be configured with a specific DL RS (e.g., an SSB, a PRS resource, or a CSI-RS resource) transmitted from a specific cell/BS/TRP using a spatial relation information configuration for an SRS resource for UE positioning, transmitted to a specific cell/BS/TRP as a target, but the UE may recognize that the spatial relation information configuration does not correspond to a transmission beam direction in which a propagation time pre-recognized by the UE with respect to the cell/BS/TRP is minimum. According to various embodiments, the UE may request a change in a spatial relation information configuration for the specific SRS resource based on the information.

According to various embodiments, with this operation of the UE, the BS may determine a DL RX beam (e.g., in which a propagation time is minimized) corresponding to the TX beam transmitted as the spatial relation information.

And/or, According to various embodiments, even if the UE does not know timing measurement information for an RS transmitted by a specific cell/BS/TRP, when the timing measurement information is continuously changed at a predetermined level or more for each occasion/period in which ToA/propagation time measurement for a specific periodic DL PRS resource is transmitted and/or when a signal intensity for a first arrival path is excessively small (e.g., small below a predetermined threshold), a problem in terms of a reception beam direction may also be considered.

Details with Triggering Condition

[QCL type and spatial relation info]

According to various embodiments, the UE may recognize a specific level of propagation time (e.g., a propagation time/ToA/ToF for a first arrival path) and/or a specific level of timing measurement quality for a specific DL RS resource (e.g., an SSB, a PRS resource, or a CSI-RS resource) transmitted from a specific physical/geometrical cell/BS/TRP. For example, when a propagation time/ToA measurement value for a specific DL RS resource (e.g., an SSB, a PRS resource, or a CSI-RS resource) configured with QCL type D of a DL PRS resource and/or spatial relation information of an SRS resource is different from a propagation time/ToA value owned by the UE for the specific cell/BS/TRP, the UE may request a change in a reception RX beam of the UE and/or a transmission beam direction of the specific cell/BS/TRP.

For example, the UE may perform measurement on an SSB (and/or PRS resource (and/or CSI-RS resource)) transmitted from a specific (physical) serving/neighboring cell/BS/TRP, and may acquire propagation time information for a specific SSB (and/or PRS resource (and/or CSI-RS resource)) index. For example, the UE may determine a propagation time reference/threshold for a specific (physical) cell/BS/TRP using the best propagation time measurement value and/or propagation time measurement quality among the SSB indexes as a reference. For example, when a DL RS resource that is a QCL type-D source configured for a DL PRS (resource) transmitted from the specific serving/neighboring cell/BS/TRP exceeds a propagation time threshold as the reference, the UE may determine that a transmission/reception beam direction of the cell/BS/TRP and the UE is not optimal for receiving the first arrival signal path and may request a change in the transmission/reception beam direction.

According to various embodiments, when the UE requests a change in the QCL type-D source, it may mean that a reception beam used by the UE is not in a direction in which the propagation time is minimized, and considering the Tx/Rx beam pair, a transmission Tx beam that is being used appropriately for the Rx beam may not be the minimum propagation time. According to various embodiments, when the UE requests a QCL-D change, it may imply that both the transmission beam of the BS and the reception beam of the UE need to be changed.

According to various embodiments, a transmission/reception beam between the UE and the BS/TRP may be aligned and configured/used in a direction suitable for timing measurement (e.g., $n^{th}$ (n: natural number) arrival signal path measurement).

For example, when the UE transmits an SRS resource for positioning to a specific cell/BS/TRP in a direction suitable for the timing measurement, it may be necessary to determine/use an appropriate transmission power for the cell/BS/TRP as a target. For example, proper transmission power may be determined only by measuring a path-loss reference for the DL RS resource of the timing measurement beam direction. To this end, one or more of the following various embodiments may be considered.

Path-loss Reference RS (beam) change request

According to various embodiments, the UE may request the BS/location server/LMF to change a specific DL RS resource configured as a path-loss reference DL RS resource among RSs transmitted from a specific cell/BS/TRP to a DL RS resource more suitable for UE positioning (more suitable for obtaining timing measurement). This may be to change the path-loss reference RS using a beam direction for transmitting and receiving the first arrival signal path most strongly as a reference.

According to various embodiments, the UE may be configured with a DL RS transmitted from a specific (physical) cell/BS/TRP as a path-loss reference DL RS. In this case, According to various embodiments, the UE may be configured with DL RS (e.g., an SSB, a PRS, and a CSI-RS) information set together with a physical cell-IDBS-ID/TRP-ID.

According to various embodiments, when propagation time measurement (e.g., a propagation time for a first arrival signal path) and/or propagation time measurement quality (e.g., a signal intensity and/or signal power for the first arrival signal path) for an RS resource (e.g., a specific SSB/PRS/CSI-RS index) configured with the path-loss reference RS exceed a propagation time reference and/or a threshold for the cell/BS/TRP, the UE may request the BS/location server/LMF to change a path-loss reference RS for the specific cell/BS/TRP.

For example, the UE may periodically measure an RSRP value and/or a propagation time (e.g., a first arrival signal path and/or an $n^{th}$ arrival signal path) for a DL RS (e.g., an SSB, a PRS, or a CSI-RS) configured as a path-loss reference RS, and when the propagation time measurement value for the RS resource exceeds a specific threshold K (>0) times or more within a specific time window, the UE may request the BS/location server/LMF to change the path-loss reference RS for the cell/BS/TRP.

And/or, According to various embodiments, another criterion may also be considered. For example, the UE may already know a specific SSB index/PRS resource (index) (/CSI-RS resource (index)) with the minimum propagation time for the specific cell/BS/TRP. Therefore, it may be considered that the UE requests a change in a path-loss reference RS in a beam direction suitable for timing measurement without a separate reference.

According to various embodiments, Cell ID +RS information may be reported to request a beam direction in which propagation time is minimized. According to various embodiments, a specific cell/BS/TRP ID and/or RS information may be reported to request a beam direction in which propagation time is minimized, which will be described below in more detail.

[Propagation time measurement quality]

In the description of various embodiments, the propagation time measurement quality for a specific DL RS resource (e.g., an SSB, a PRS resource, or a CSI-RS resource) may be variously interpreted/defined/configured/determined.

For example, the propagation time measurement quality may be seen as a signal intensity/power level for the first arrival signal path.

For example, when a propagation delay profile for a specific RS resource includes five signal taps, a ratio of signal power of a first arrival signal path to each other signal path may be defined/considered.

For example, an absolute value for signal intensity/power of the first arrival signal path may be defined/considered.

For example, since the first arrival signal may be seen as a noise signal, the propagation time delay and/or signal intensity for the first N (>0) signal paths may be defined/considered.

For example, propagation time measurement quality may be defined/considered as signal power/strength for a first arrival signal path, which exceeds a specific signal power/strength level.

In the description of various embodiments, an operation of the UE selecting one having the best measurement quality may mean selecting the largest measurement criterion/quantity/value to be defined/determined/interpreted in various ways.

According to various embodiments, the UE may select and/or report N-best measurement quality. This may mean that the UE selects and/or reports N pieces having the largest measurement quality value among the obtained measurement qualities.

UE reporting information

According to various embodiments, when the UE requests a beam change of the BS and the UE, a specific physical cell/BS/TRP information and/or a DL RS resource ID/index transmitted from the cell/BS/TRP (e.g., an SSB/PRS resource/CSI-RS resource index) may be reported/transmitted to BS/location server/LMF. According to various embodiments, it may be seen that the UE transmits information requesting that the specific/BS/TRP be transmitted in the RS resource beam direction.

According to various embodiments, the UE may request to use a TX beam direction of a specific angle/direction for a PRS resource transmitted from a specific cell/BS/TRP. According to various embodiments, the UE may request to use a TX beam of a specific angle using absolute/relative coordinates as a reference. And/or, According to various embodiments, the UE may also request information on a beam width as well as information on a beam direction.

According to various embodiments, when the UE requests a beam change, the UE may notify the B S/location server/LMF about propagation time/ToA measurement value information on a beam (DL RS resource (e.g., an SSB, a PRS resource, or a CSI-RS resource)) to be requested to be changed. And/or, According to various embodiments, the UE may report propagation time difference value information between the reference/critical propagation time value and the beam/DL RS resource requesting change to the BS/location server/LMF.

According to various embodiments, the UE may report DL RS information (e.g., PRS resource ID/PRS resource set ID/SSB index) from cell/BS/TRP and RS information configured as QCL type-D and/or spatial relation information to the BS/location server/LMF. This information may be characterized to be selected only from RSs configured with QCL type-D and/or spatial relation information.

In addition and/or separately, According to various embodiments, the location server/LMF may recommend/indicate (a beam direction of a cell/BS/TRP for transmitting) a transmit DL PRS and/or a beam direction of a cell/BS/TRP receiving a UL SRS (for positioning) to the BS. According to various embodiments, since the UE performs timing measurement and reports related information to the location server/LMF, the location server/LMF may know better than the BS for transmission/reception beam information suitable for measuring the timing measurement. According to various embodiments, information related to the beam recommended/delivered by the location server/LMF to the BS may be transferred through NRPPa.

Proposal #3: Timing measurement compensation (Downlink)

When indicated/configured UE reception RX beam is not optimized for positioning (and/or, when TX beam of BS corresponding thereto is not optimized for positioning)

For example, when a QCL type-D of a PRS resource is configured to configure a reception beam appropriate for the UE through an RSRP/SINR/SNR-based beam management procedure, the beam direction may be different from an optimal beam for timing measurement acquisition.

[Data storage]

According to various embodiments, the UE may be indicated/configured to perform measurement of an RSRP/SINR/SNR for a specific DL RS resource (e.g., an SSB, a PRS resource, or a CSI-RS resource) transmitted from a (physical/geometrical) serving/neighboring cell/BS/TRP. According to various embodiments, when the UE performs measurement of an RSRP/SINR/SNR for a specific DL RS resource, the UE may measure and store a propagation time for an $n^{th}$ (n: natural number) arrival signal path and/or a signal intensity of the $n^{th}$ arrival signal path. According to various embodiments, such an operation of the UE may be configured/indicated from a network and/or the UE may perform the operation (as a default operation) without a separate instruction/configuration. And/or, According to various embodiments, whether or not to perform the operation may be determined according to the UE capability of the UE. For example, information on UE capability related to the above-described operation of the UE may be reported to the network. For example, the network may indicate/configure the operation according to the UE capability. As another example, when the above-described operation of the UE is supported by the UE, the UE may perform the above operation (as a default operation) without a separate indication/configuration.

According to various embodiments, the UE may measure and store the propagation time for each SSB index (and/or CSI-RS resource/PRS resource). According to various embodiments, the UE may store the propagation time for the reception beam direction used when receiving the RS. For example, the UE may perform this operation within a specific window period and/or buffering area. For example, such information may be utilized for UE positioning.

Case 1

According to various embodiments, when the UE receives a DL PRS resource transmitted from a specific cell/BS/TRP for UE positioning, the UE may follow a QCL type-D (e.g., an SSB/PRS resource/C SI-RS resource) configured to be used when receiving the DL PRS resource.

For example, even if the UE knows a reception beam direction more suitable for timing measurement, the UE may follow the indication/configuration of the network. For example, the UE may receive a DL PRS resource based on the reception beam direction indicated/configured from the network, but one or more of the following options may be considered:

Option1

According to various embodiments, the UE may acquire (a measurement value of) a propagation time/ToA/ToF for the DL PRS resource once. According to various embodiments, the UE may recognize a (an expected/estimated measurement value of) of the propagation time/ToA/ToF expected/estimated when receiving the DL PRS transmitted from the cell/BS/TRP is received in an optimized reception beam direction, based on pre-stored data. According to various embodiments, the UE may compensate the propagation time/ToA/ToF measurement value for the PRS resource based on the pre-stored data. For example, a difference between the expected/estimated measurement value and the measurement value for the received DL PRS resource may be compensated.

According to various embodiments, the UE may calculate/obtain an RSTD measurement value and/or a UE RX-TX time difference measurement value using the compensated value, and may report it to the B S/location server/ LMF.

Option2

According to various embodiments, the UE may not compensate for timing measurement obtained for the DL PRS resource and may use the timing measurement to report RSTD and/or UE RX-TX time difference measurement without changes.

In addition and/or separately, According to various embodiments, the UE may inform the BS/location server/ LMF of a value that requires compensation for the reported value. For example, a delta may be reported as a difference value for the reported RSTD value and/or UE RX-TX time difference measurement value. According to various embodiments, the operation of the UE may be indicated/configured from the BS/location server/LMF.

Case 2

According to various embodiments, when the UE receives a DL PRS resource transmitted from a specific cell/BS/TRP for UE positioning, the UE may use a reception beam more suitable for timing measurement (e.g., a propagation time/ ToA/ToF) rather than following a QCL type-D (e.g., an SSB/PRS resource/CSI-RS resource) configured to be used when the UE receives the DL PRS resource. According to various embodiments, the operation of the UE may be indicated/configured from the BS/location server/LMF.

According to various embodiments, when the UE identifies a reception beam more suitable for timing measurement, the UE may be configured/indicated to use the reception beam. According to various embodiments, in this case, the UE may use a reception beam direction suitable for obtaining timing measurement.

However, for example, a cell/BS/TRP for transmitting the PRS resource may use a transmission beam that is the RSRP/SNR/SINR maximum, not a transmission beam direction optimal for timing measurement acquisition.

For example, the UE may report the used reception beam (e.g., an RS resource ID/index) and/or reception panel information to the BS/location server/LMF. For example, the operation of the UE may be mandatory. For example, the UE may basically perform such an operation without separate configuration/indication. This may be taken into consideration that may not be suitable for measurement acquisition because the reception beam is directed to a direction other than a direction in which transmission to a main lobe from a transmitting end is performed.

In the description of various embodiments, the "panel" may be variously interpreted as a "group of antenna elements of UE"/"group of antenna ports of UE"/"group of logical antennas of UE". For example, which physical/ logical antennas and/or antenna ports are bundled and mapped to one panel may be determined using various methods in consideration of a location/distance/correlation between antennas/radio frequency (RF) configuration/antenna (port) virtualization method, etc. For example, such a mapping process may vary according to implementation of the UE.

And/or, in the description of various embodiments, the "panel" may be replaced with "a plurality of panels" and/or "panel group" (which have similarity in terms of a specific characteristic (e.g., when a difference in values related to the specific characteristic is within a predetermined range and/or is below a predetermined threshold, etc.).

Case 1 and Case 2 according to various embodiments may be performed separately or may be performed in combination. For example, when the UE is configured/indicated to use a reception beam more suitable for timing measurement by itself, the UE may be operated according to Case 2, and when the UE is not configured/indicated, the UE may be operated according to Case 1.

(Uplink)

When indicated/configured UE transmission TX beam is not optimized for positioning (and/or, when RX beam of BS corresponding thereto is not optimized for positioning)

In the description of various embodiments, in order to configure a transmission TX beam suitable for the UE through RSRP/SINR/SNR-based beam management or the like, an SSB or the like may be configured/indicated with a spatial relation source of an SRS resource.

Case 1

According to various embodiments, the UE may follow spatial relation information indicated from a network without changes in order to transmit an SRS resource for positioning.

For example, the UE may not know exactly an effect on timing measurement reception of a cell/BS/TRP according to a transmission beam, but according to a beam direction identified when receiving the DL PRS/SSB, the UE may recognize a degree of an effect on DL timing measurement. Therefore, According to various embodiments, the UE may report a difference in timing measurement according to the beam direction identified when receiving DL to the BS/location server/LMF. For example, the UE may inform a correction value for gNB RX-TX time difference measurement of a specific cell/BS/TRP.

For example, in this case, since the UE has an effect on the transmission beam, the UE may not correct UE RX-TX time difference measurement thereof. For example, the UE may report a timing measurement difference between an SSB #0 direction configured as spatial relation information and an SSB #1 direction for obtaining best timing measurement upon DL reception and may use the timing measurement difference in correction.

Case 2

According to various embodiments, when the UE transmits an SRS resource for positioning, the UE may change the current beam to a beam more suitable for timing measurement without using spatial relation information indicated/configured in the SRS resource. According to various embodiments, the UE may report the changed TX beam direction information (e.g., an SRS resource ID, an SSB index, or a PRS resource ID) to the BS/location server/LMF. For example, the TX beam direction information may include specific RS information and/or transmission panel information of the UE.

Case 1 and Case 2 according to various embodiments may be performed separately or may be performed in combination. For example, when the UE is configured/indicated to use a transmission beam more suitable for timing measurement by itself, the UE may be operated according to Case 2, and when the UE is not configured/indicated, the UE may be operated according to Case 1.

Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

DL BM Process

ADL BM process may include (1) transmission of beamformed DL RSs (e.g., CSI-RSs or SSBs) from a BS and (2) beam reporting from a UE.

The beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 15:
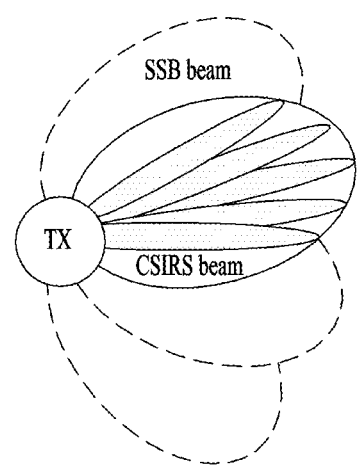
FIG. 15 is a diagram illustrating exemplary beamforming using an SSB and a CSI-RS, which is applicable to Various embodiments.

FIG. 15 is a diagram illustrating exemplary beamforming using an SSB and a CSI-RS, which is applicable to Various embodiments.

Referring to FIG. 15, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive SSBs for the same SSBRI, while changing an Rx beam across multiple SSB bursts at a UE. One SS burst includes one or more SSBs, and one SS burst set includes one or more SSB bursts.

DL BM Using SSB

Figure 16:
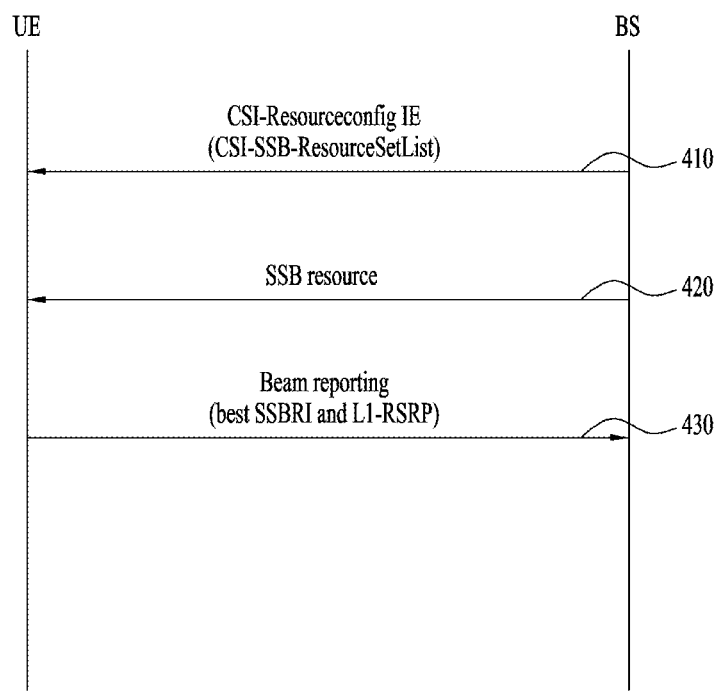
FIG. 16 is a diagram illustrating a signal flow for an exemplary DL BM process using an SSB, which is applicable to Various embodiments.

FIG. 16 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1610). The RRC parameter, csi-SSB-ResourceSetList is a list of SSB resources used for BM and reporting in one resource set. The SSB resource set may be configured as {SSBx1, SSBx2, SSBx3, SSBx4, . . . }. SSB indexes may range from 0 to 63.

— The UE receives signals in the SSB resources from the BS based on CSI-SSB-ResourceSetList (420).

When CSI-RS reportConfig related to an SSBRI and RSRP reporting has been configured, the UE reports a best SSBRI and an RSRP corresponding to the best SSBRI to the BS (430). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used as a tracking reference signal (TRS); and iii) when either of Repetition or TRS_info is not configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams.

Figure 17A:
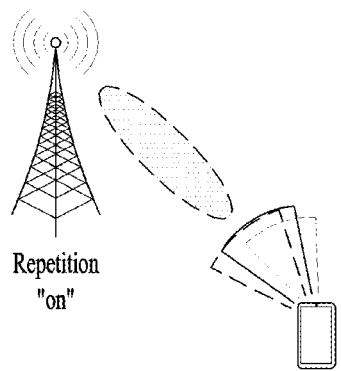
FIGS. 17A and 17B illustrate an exemplary DL BM process using a CSI-RS, which is applicable to Various embodiments.
Figure 17B:
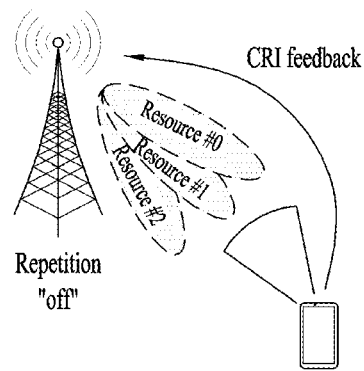

FIGS. 17A and 17B illustrate an exemplary DL BM process using a CSI-RS, which is applicable to Various embodiments.

FIG. 17A illustrates an Rx beam determination (or refinement) process of a UE, and FIG. 11B illustrates a Tx beam sweeping process of a BS. Further, FIG. 17A is for a case in which Repetition is set to 'ON', and FIG. 17B is for a case in which Repetition is set to 'OFF'.

Figure 18:
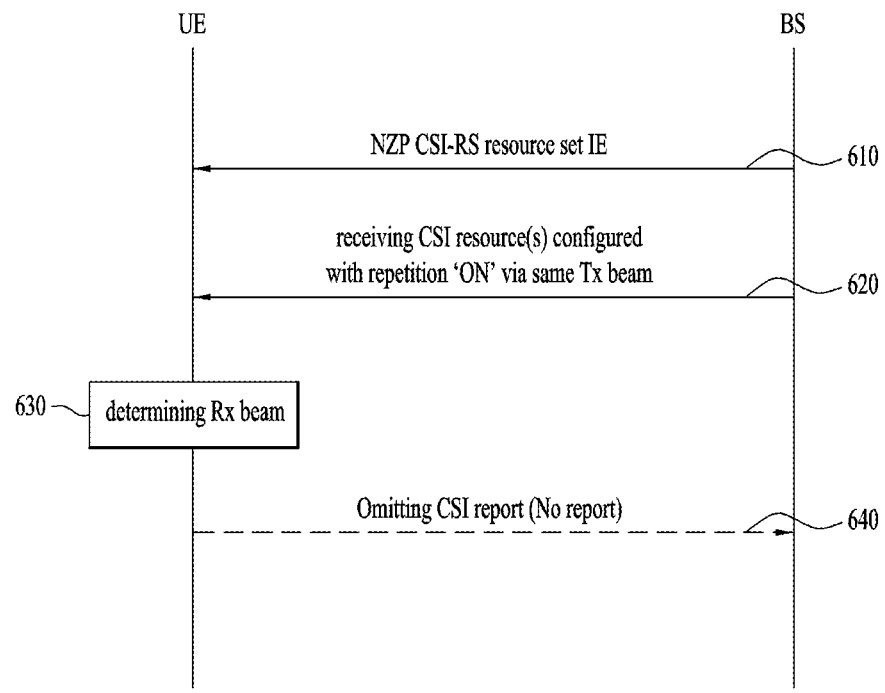
FIG. 18 is a diagram illustrating a signal flow for an exemplary Rx beam determination process of a UE, which is applicable to Various embodiments.

With reference to FIGS. 17A and 18, an Rx beam determination process of a UE will be described below.

FIG. 18 is a diagram illustrating a signal flow for an exemplary Rx beam determination process of a UE.

The UE receives an NZP CSI-RS resource set IE including an RRC parameter 'repetition' from a BS by RRC signaling (610). The RRC parameter 'repetition' is set to 'ON' herein.

The UE repeatedly receives signals in resource(s) of a CSI-RS resource set for which the RRC parameter 'repetition' is set to 'ON' on the same Tx beam (or DL spatial domain Tx filter) of the BS in different OFDM symbols (620).

The UE determines its Rx beam (630).

The UE skips CSI reporting (640). That is, the UE may skip CSI reporting, when the RRC parameter 'repetition' is set to 'ON'.

Figure 19:
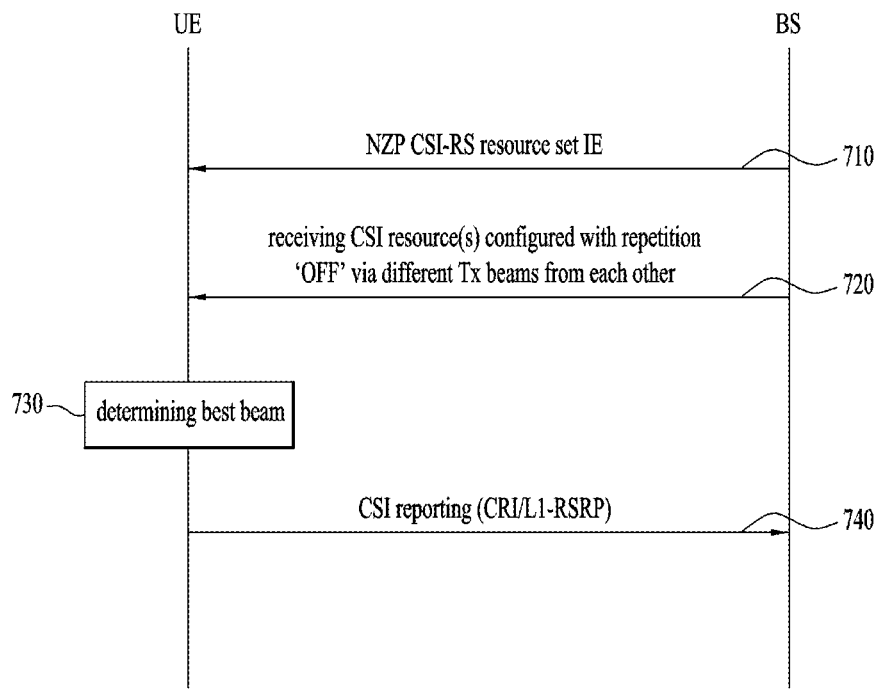
FIG. 19 is a diagram illustrating an exemplary Tx beam determination process of a BS, which is applicable to Various embodiments.
Figure 20:
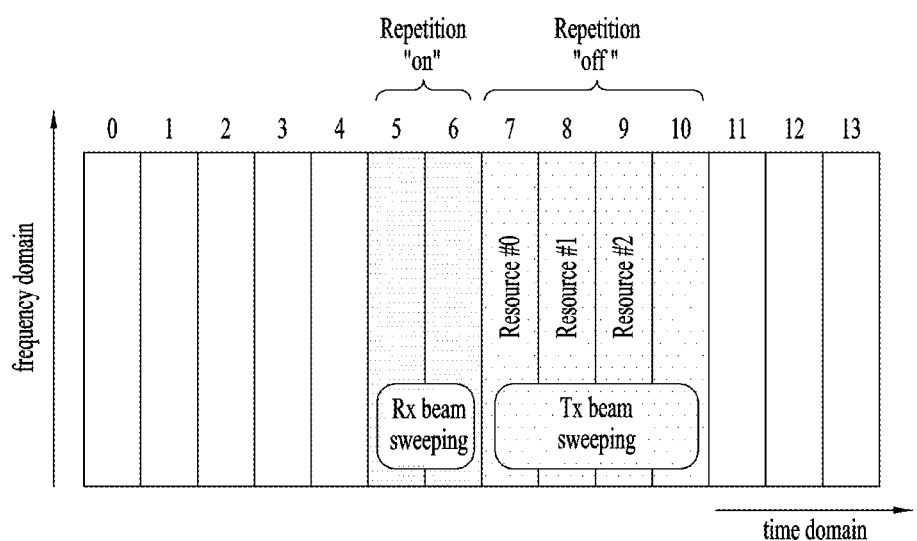
FIG. 20 shows an example of resource allocation in the time and frequency domains, which is applicable to Various embodiments.

With reference to FIGS. 17B and 19, a Tx beam determination process of a BS will be described below.

FIG. 19 is a diagram illustrating an exemplary Tx beam determination process of a BS, which is applicable to Various embodiments.

A UE receives an NZP CSI-RS resource set IE including an RRC parameter 'repetition' from the BS by RRC signaling (710). Herein, the RRC parameter 'repetition' is set to 'OFF', which is related to a Tx beam sweeping process of the BS.

The UE receives signals in resource(s) of a CSI-RS resource set for which the RRC parameter 'repetition' is set to 'OFF' on different Tx beams (or DL spatial domain Tx filters) of the BS (720).

The UE selects (or determines) a best beam (740).

The UE reports the ID (e.g., CRI) of the selected beam and related quality information (e.g., an RSRP) to the BS (740). That is, the UE reports a CRI and an RSRP corresponding to the CRI to the BS, when a CSI-RS is transmitted for BM.

FIG. 14 is a diagram illustrating exemplary resource allocation in the time and frequency domains.

For example, time and frequency resources may be for the DL BM process of FIGS. 11A and 11B.

When repetition is set to 'ON' for a CSI-RS resource set, the same Tx beam may be repeatedly used for a plurality of CSI-RS resources, whereas when repetition is set to 'OFF' for the CSI-RS resource set, different CSI-RS resources may be transmitted on different Tx beams.

DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 8 describes an example of a TCI-State IE. The TC-State IE is related to a QCL type corresponding to one or two DL RSs.

TABLE 8

- TCI-State
The IE TCI-State associates one or two DL reference signals with a corresponding quasi-colocation (QCL) type.
TCI-State information element

```
-- ASN1START
-- TAG-TCI-STATE-START
TCI-State : : =            SEQUENCE {
    tci-StateId                TCI-StateId,
    qcl-Type1                  QCL-Info,
    qcl-Type2                  QCL-Info            OPTIONAL,   -- Need R
    ...
}
QCL-Info : : =             SEQUENCE {
    cell                       ServCellIndex       OPTIONAL,   -- Need R
    bwp-Id                     BWP-Id              OPTIONAL,   -- Cond CSI-RS-Indicated
    referenceSignal                   CHOICE {
```

TABLE 8-continued

```
    csi-rs              NZP-CSI-RS-ResourceId,
    ssb                 SSB-Index
    },
    qcl-Type            ENUMERATED {typeA, typeB, typeC, typeD},
    . . .
}
-- TAG-TCI-STATE-STOP
-- ASN1STOP
```

In Table 8, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

UL BM Process

The DL BM process may include (1) transmission of beamformed DL RSs (e.g., CSI-RSs or SSBs) from a BS and (2) beam reporting from a UE.

In UL BM, reciprocity (or beam correspondence) between a Tx beam and an Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K>1 SRS resources, where K is a natural number and a maximum value of K is indicated by SRS capability.

Like DL BM, the UL BM process may be divided into a UE's Tx beam sweeping and a BS's Rx beam sweeping.

Figures 21A, 21B:
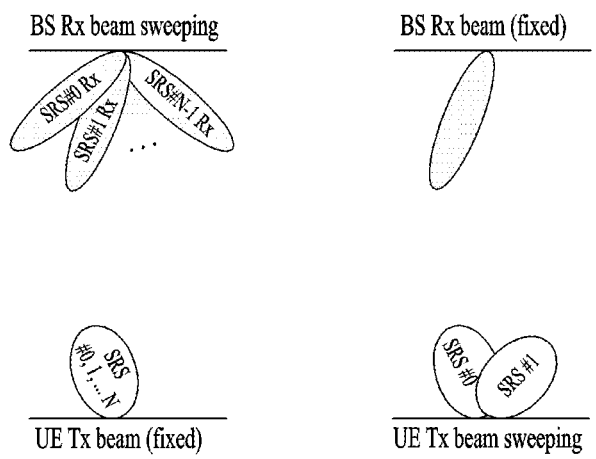
FIGS. 21A and 21B illustrate an exemplary UL BM process using a SRS, which is applicable to Various embodiments.

FIGS. 21A and 21B illustrate an exemplary UL BM process using a SRS, which is applicable to Various embodiments.

FIG. 21A illustrates an Rx beamforming determination process of a BS, and FIG. 21B illustrates a Tx beam sweeping process of a UE.

Figure 22:
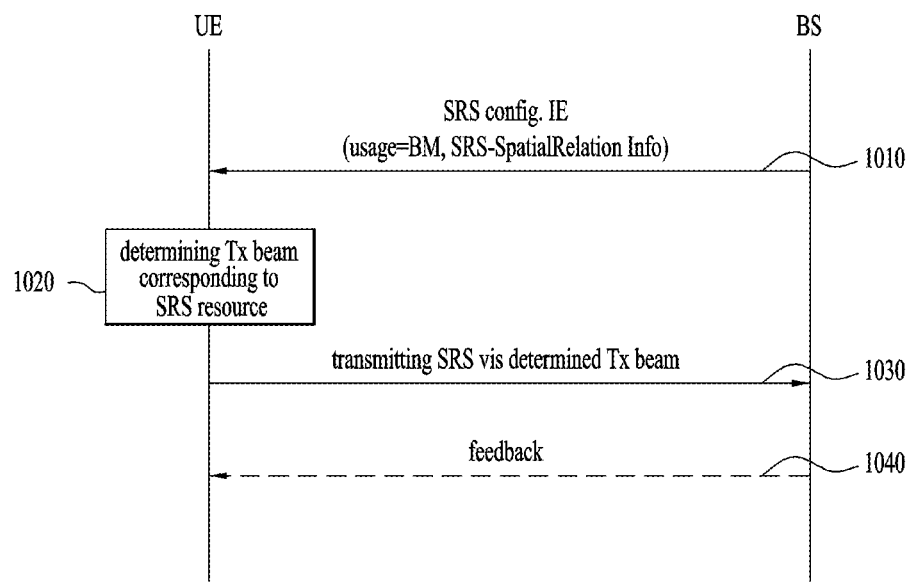
FIG. 22 is a diagram illustrating a signal flow for an exemplary UL BM process using an SRS, which is applicable to Various embodiments.

FIG. 22 is a diagram illustrating a signal flow for an exemplary UL BM process using an SRS, which is applicable to Various embodiments.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationInfo is configured for an SRS resource, the same beamforming as used for the SSB, the CSI-RS, or the SRS is applied for transmission. However, if SRS-SpatialRelationInfo is not configured for the SRS resource, the UE randomly determines Tx beamforming and transmits the SRS by the determined Tx beamforming (1030).

More specifically, for a P-SRS with ' SRS-ResourceConfigType' set to 'periodic':

i) if SRS-SpatialRelationInfo is set to SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

Uplink Power Control

In wireless communication systems, it may be necessary to increase or decrease the transmission power of a UE and/or a mobile device depending on situations. Controlling the transmission power of the UE and/or mobile device may be referred to as UL power control. For example, transmission power control may be applied to satisfy requirements (e.g., signal-to-noise ratio (SNR), bit error ratio (BER), block error ratio (BLER), etc.) of a BS (e.g., gNB, eNB, etc.).

The above-described power control may be performed according to an open-loop power control method and a closed-loop power control method.

Specifically, the open-loop power control method refers to a method of controlling transmission power without feedback from a transmitting device (e.g., BS, etc.) to a receiving device (e.g., UE, etc.) and/or feedback from the receiving device to the transmitting device. For example, the UE may receive a specific channel/signal (pilot channel/signal) from the BS and estimate the strength of received power based on the received channel/signal. Then, the UE may control the transmission power based on the strength of the estimated received power.

On the other hand, the closed-loop power control method refers to a method of controlling transmission power based on feedback from a transmitting device to a receiving device and/or feedback from the receiving device to the transmitting device. For example, the BS receives a specific channel/signal from the UE and determines an optimal power level of the UE based on a power level, SNR, BER, BLER, etc. which are measured based on the received specific channel/signal. The BS may transmit information (i.e., feedback) on the determined optimal power level to the UE on a control channel, and the UE may control the transmission power based on the feedback provided by the BS.

Hereinafter, power control methods for cases in which a UE and/or a mobile device perform UL transmission to a BS in a wireless communication system will be described in detail. Specifically, power control methods for transmission of: 1) a UL data channel (e.g., PUSCH); 2) a UL control channel (e.g., PUCCH); 3) an SRS; and/or 4) a random access channel (e.g., PRACH) will be described. In this case, a transmission occasion (i.e., transmission time unit) (i) for the PUSCH, PUCCH, SRS and/or PRACH may be defined by a slot index (n_s) in a frame with a system frame number (SFN), a first symbol (S) in a slot, the number of consecutive symbols (L), and the like.

Power Control of SRS

In relation to SRS transmission in an active UL BWP of a carrier (f) of a serving cell (c), the UE may calculate a linear power value of transmission power determined by Equation 3 below. Thereafter, the UE may control the transmission power by equally dividing the calculated linear power value over antenna port(s) configured for the SRS.

Specifically, when the UE performs SRS transmission in an active UL BWP (b) of the carrier (f) of the serving cell (c) using an SRS power control adjustment state based on index 1, the UE may determine SRS transmission power $P_{SRS, b, f, c}$ (i, $q_s$) (dBm) on an SRS transmission occasion (i) based on Equation 7 below.

[Equation 7]

$$P_{SRS,b,f,c}(i, q_s, l) = \min \begin{cases} P_{CMAX,f,c}(i), \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{cases}$$

In Equation 7, q_s denotes the index of an open-loop power control parameter (e.g., P_o, alpha (a), a DL RS resource for a path loss (PL) measurement (e.g., $PL_{b, f, c}$ ($q_d$)), etc.), which may be configured for SRS resource set. Index 1 denotes the index of a closed-loop power control process, and the corresponding index may be configured independently of a PUSCH or configured in relation to the PUSCH. If SRS power control is not related to the PUSCH, the maximum number of closed-loop power control processes for the SRS may be 1.

In addition, P_o (e.g., $P_{o\_SRS, b, f, c}$ ($q_s$)) is a parameter broadcast as part of system information and may denote target received power of the receiver. The corresponding P_o value may be configured in consideration of UE throughput, cell capacity, noise and/or interference, etc. Alpha (e.g., $\alpha_{SRS, b, f, c}(q_s)$) may denote a rate for compensating for PL. Alpha may have a value from 0 to 1, and full path loss compensation or fractional path loss compensation may be performed according to the configured value. In this case, the alpha value may be configured in consideration of interference between UEs and/or data rates. In addition, $P_{CMAX, f, c}(i)$ may denote configured UE transmission power. For example, the configured UE transmission power may be interpreted as 'configured maximum UE output power' defined in 3GPP TS 38.101-1 and/or TS 38.101-2. $M_{SRSb, f, c}(i)$ may denote an SRS resource allocation bandwidth, which is expressed by the number of RBs in the SRS transmission occasion based on an SCS ($\mu$). In addition, $h_{b,f,c}(i, l)$, which is related to SRS power control adjustment states, may be configured or indicated based on a TPC command field of DCI received or detected by the UE (e.g., DCI format 2_3, etc.) and/or an RRC parameter (e.g., srs-PowerControlAdjustmentStates, etc.).

A resource for SRS transmission may be applied as a reference for the BS and/or UE to determine a beam, a panel, and/or a spatial domain transmission filter. Thus, SRS transmission power control may be performed in units of beams, panels, and/or spatial domain transmission filters.

The above-described parameters and/or information for SRS power control may be configured separately (independently) for each BWP. In this case, the corresponding parameters and/or information may be configured or indicated by higher layer signaling (e.g., RRC signaling, MAC-CE, etc.) and/or DCI. For example, the parameters and/or information for SRS power control may be provided by RRC signaling such as SRS-Config, SRS-TPC-Command-Config, etc. Table 9 below shows the configurations of SRS-Config and SRS-TPC-CommandConfig. The definition and details of each parameter may be found in 3GPP TS Rel.16 38.331.

TABLE 9

| | | |
|---|---|---|
| SRS-Config := | SEQUENCE { | |
| srs-ResourceSetToReleaseList | SEQUENCE | |
| (SIZE(1..maxNrofSRS-ResourceSets)) OF SRS-ResourceSetId | | OPTIONAL, - |
| - Need N | | |
| srs-ResourceSetToAddModList | SEQUENCE | |
| (SIZE(1..maxNrofSRS-ResourceSets)) OF SRS-ResourceSet | | OPTIONAL, - |
| - Need N | | |
| srs-ResourceToReleaseList | SEQUENCE | |
| (SIZE(1..maxNrofSRS-Resources)) OF SRS-ResourceId | | OPTIONAL, - |
| - Need N | | |

TABLE 9-continued

| | | |
|---|---|---|
| srs-ResourceToAddModList (SIZE(1..maxNrofSRS-Resources)) OF SRS-Resource | SEQUENCE | OPTIONAL, -- Need N |
| tpc-Accumulation ..., | ENUMERATED {disabled} | OPTIONAL, -- Need S |
| SRS-ResourceSet ::= | SEQUENCE { | |
| srs-ResourceSetId | SRS-ResourceSetId, | |
| srs-ResourceIdList (SIZE(1..maxNrofSRS-ResourcesPerSet)) OF SRS-ResourceId | SEQUENCE | OPTIONAL, -- Cond Setup |
| resourceType | CHOICE { | |
| aperiodic | SEQUENCE { | |
| aperiodicSRS-ResourceTrigger TriggerStates-1), | INTEGER (1..maxNrofSRS- | |
| csi-RS OPTIONAL, -- Cond NonCodebook | NZP-CSI-RS-ResourceId | |
| slotOffset OPTIONAL, -- NeedS ..., [[ | INTEGER (1..32) | |
| aperiodicSRS-ResourceTriggerList (SIZE(1..maxNrofSRS-TriggerStates-2)) | SEQUENCE | |
| OF INTEGER (1..maxNrofSRS-TriggerStates-1) ]] }, | OPTIONAL | -- Need M |
| semi-persistent | SEQUENCE { | |
| associatedCSI-RS OPTIONAL, -- Cond NonCodebook ... }, | NZP-CSI-RS-ResourceId | |
| periodic | SEQUENCE { | |
| associatedCSI-RS OPTIONAL, -- Cond NonCodebook ... } }, | NZP-CSI-RS-ResourceId | |
| usage {beamManagement, codebook, nonCodebook, antennaSwitching}, | ENUMERATED | |
| alpha OPTIONAL, -- Need S | Alpha | |
| p0 OPTIONAL, -- Cond Setup | INTEGER (-202..24) | |
| pathlossReferenceRS OPTIONAL, - Need M | PathlossRef'erenceRS-Config | |
| srs-PowerControlAdjustmentStates separateClosedLoop} ..., [[ | ENUMERATED {sameAsFci2, OPTIONAL, -- Need S | |
| pathlossReferenceRS-List-r16 (SIZE(1..maxNrofSRS-PathlossReferenceRS-r16-1)) OF PathlossReferenceRS-Config OPTIONAL -- Need M ]] } | SEQUENCE | |
| PathlossReferenceRS-Config ::= | CHOICE { | |
| ssb-Index | SSB-Index, | |
| csi-RS-Index } | NZP-CSI-RS-ResourceId | |
| SRS-PosResourceSet-r16 ::= | SEQUENCE { | |
| srs-PosResourceSetId-r16 r16, | SRS-PosResourceSetId- | |
| srs-PosResourceIdList-r16 (SIZE(1..maxNrofSRS-ResourcesPerSet)) OF SRS-PosResourceId-r16 OPTIONAL, -- Cond Setup | SEQUENCE | |
| resourceType-r16 | CHOICE { | |
| aperiodic-r16 | SEQUENCE { | |
| aperiodicSRS-ResourceTriggerList-r16 (SIZE(1..maxNrofSRS-TriggerStates-1)) | SEQUENCE | |
| OF INTEGER (1..maxNrofSRS-TriggerStates-1) | OPTIONAL, -- Need M | |
| slotOffset-r16 OPTIONAL, -- Need S ... }, | INTEGER (1..32) | |
| semi-persistent-r16 ... }, | SEQUENCE { | |
| periodic-r16 } }, | SEQUENCE { | |

TABLE 9-continued

```
    alpha-r16                                  Alpha
OPTIONAL, -- Need S
    p0-r16                                     INTEGER (-202..24)
OPTIONAL, -- Cond Setup
    pathlossReferenceRS-Pos-r16                CHOICE {
        ssb-Index-16                               SSB-Index,
        csi-RS-Index-r16                           NZP-CSI-RS-ResourceId,
        ssb-r16                                    SSB-InfoNcell-r16,
        dl-PRS-r16                                 DL-PRS-Info-r16
    }
OPTIONAL, -- Need M
    ...
}
    SRS-TPC-CommandConfig ::=                  SEQUENCE {
        startingBitOfFormat2-3                     INTEGER (1..31)
OPTIONAL,   -- Need R
        fieldTypeFormat2-3                         INTEGER (0..1)
OPTIONAL,   -- Need R
    ...,
    [[
        startingBitOfFormat2-3SUL                  INTEGER (1..31)
OPTIONAL    -- NeedR
    ]]
}
```

The UE may determine or calculate the PRACH transmission power according to the above-described method and transmit the PRACH based on the determined or calculated PRACH transmission power.

Figure 23:
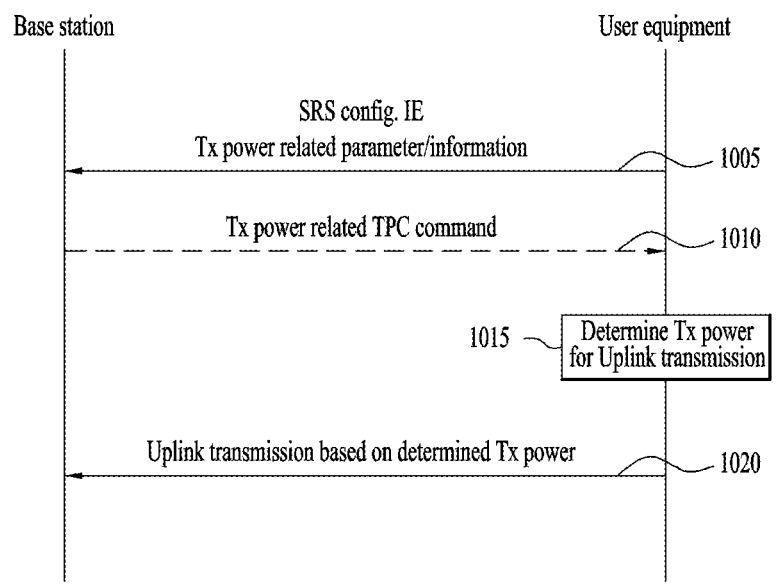
FIG. 23 is a diagram illustrating an exemplary procedure for controlling UL transmission power to which various embodiments are applicable.

FIG. 23 is a diagram illustrating an exemplary procedure for controlling UL transmission power to which various embodiments are applicable.

First, a UE may receive parameters and/or information related to transmission power (Tx power) from a BS (1005). In this case, the UE may receive the corresponding parameters and/or information through higher layer signaling (e.g., RRC signaling, MAC-CE, etc.). For example, for PUSCH transmission, PUCCH transmission, SRS transmission, and/or PRACH transmission, the UE may receive the above-described parameters and/or information related to transmission power control.

The UE may receive a TPC command related to transmission power from the BS (1010). In this case, the UE may receive the corresponding TPC command through lower layer signaling (e.g., DCI). For example, for PUSCH transmission, PUCCH transmission, and/or SRS transmission, the UE may receive information on a TPC command to be used for determining a power control adjustment state, etc. in a TPC command field of a predefined DCI format as described above. However, the corresponding step may be omitted in PRACH transmission.

The UE may determine (or calculate) transmission power for UL transmission based on the parameters, information, and/or TPC command received from the BS (1015). For example, the UE may determine PUSCH transmission power, PUCCH transmission power, SRS transmission power, and/or PRACH transmission power according to the above-described methods (e.g., Equations 1 to 4, etc.). Additionally/alternatively, when two or more UL channels and/or signals need to be transmitted together as in carrier aggregation, the UE may determine the transmission power for UL transmission in consideration of the above-described priorities.

The UE may perform transmission of one or more UL channels and/or signals (e.g., PUSCH, PUCCH, SRS, PRACH, etc.) to the BS based on the determined (or calculated) transmission power (1020).

The above-described beam management procedure and/or uplink power control procedure may be combined with the contents of Sections 1 to 3 above to configure other various embodiments, which are obvious to one of ordinary skill in the art.

Figure 24:
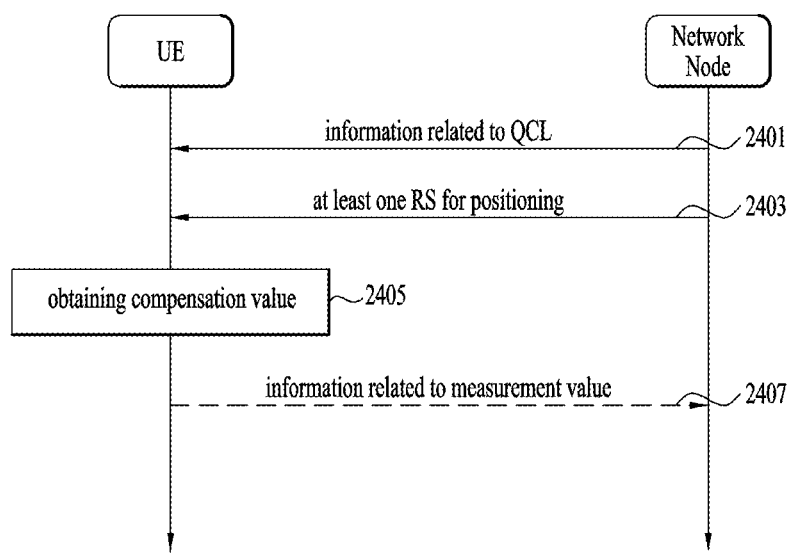
FIG. 24 is a diagram schematically illustrating a method of operating a UE and a network node according to various embodiments.

FIG. 24 is a diagram schematically illustrating a method of operating a UE and a network node according to various embodiments.

Figure 25:
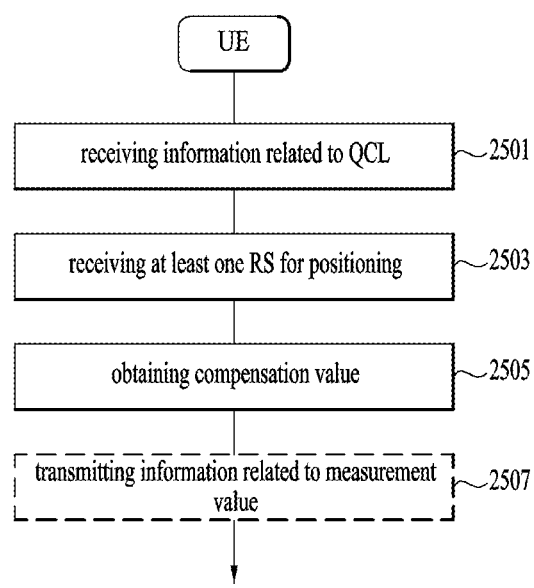
FIG. 25 is a flowchart illustrating a method of operating a UE according to various embodiments.

FIG. 25 is a flowchart illustrating a method of operating a UE according to various embodiments.

Figure 26:
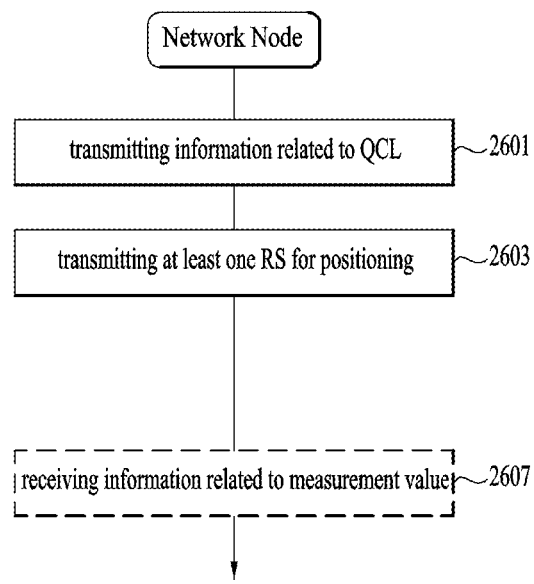
FIG. 26 is a flowchart illustrating a method of operating a network node according to various embodiments.

FIG. 26 is a flowchart illustrating a method of operating a network node according to various embodiments. For example, the network node may be a TP, a BS, a cell, a location server, an LlVfF, and/or any device performing the same work.

Referring to FIGS. 24 to 26, in operations 2401, 2501, and 2601 according to various embodiments, a network node may transmit information related to Quasi co-located (QCL) between at least one downlink (DL) Reference signal (RS) resource and at least one RS resource for positioning and the UE may receive the information.

In operations 2403, 2503, and 2603 according to Various embodiments, the network node may transmit at least one RS for positioning and the UE may receive the RSs.

In operations 2405 and 2505 according to Various embodiments, the UE may acquire the compensation value for positioning based on that a first RS resource obtained from the at least one RS resource for the positioning is different from a second RS resource based on the information related to QCL and a quality measurement value related to each of the at least one DL RS.

According to various embodiments, the second RS resource may be obtained from the at least one RS resource for the positioning based on a propagation time related to each of the at least one DL RS resource.

In operations 2407, 2507, and 2607 according to Various embodiments, the UE may transmit the measurement value for positioning related to the compensation value for positioning and the network node may receive the measurement value for positioning.

Not all of operations 2401 to 2607 according to various embodiments are essential, and one or more operations may be omitted. For example, operations 2407, 2507, and 2607 may be omitted.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various embodiments 4.1. Exemplary configurations of devices to which various embodiments are applied FIG. 27 is a diagram illustrating a device that implements various embodiments.

Figure 27:
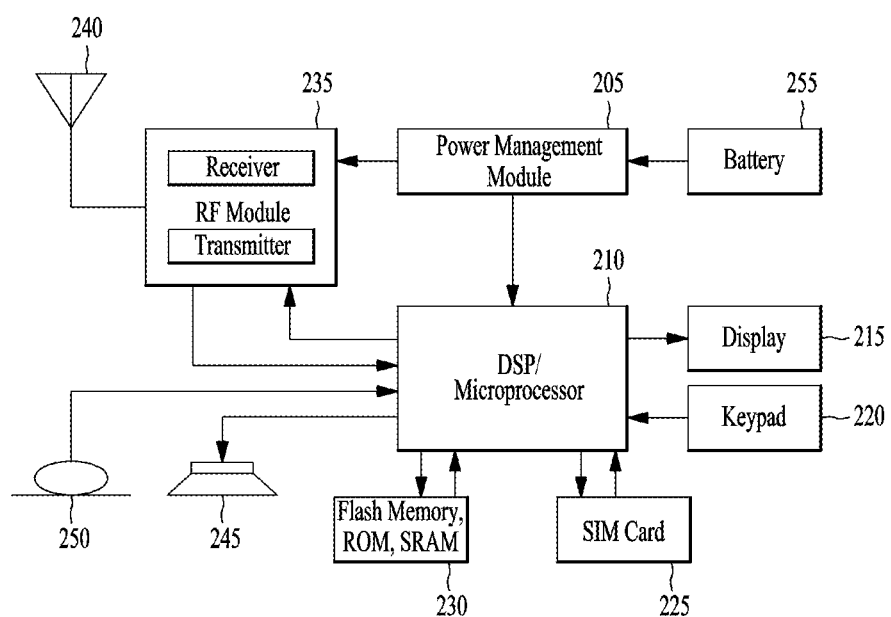
FIG. 27 is a block diagram illustrating an apparatus for implementing various embodiments.

The device illustrated in FIG. 27 may be a UE and/or a BS (e.g., eNB or gNB or TP) and/or a location server (or LMF) which is adapted to perform the above-described mechanism, or any device performing the same operation.

Referring to FIG. 27, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 27 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 27 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, one or more processors included in a UE (or one or more processors of a communication device included in the UE) may receive information related to Quasi co-located (QCL) between at least one downlink (DL) Reference signal (RS) resource and at least one RS resource for positioning.

According to various embodiments, the one or more processors included in the UE may receive the at least one RS resource for positioning.

According to various embodiments, the one or more processors included in the UE may obtain a compensation value for positioning based on that a first RS resource obtained from the at least one RS resource for positioning is different from a second RS resource based on the information related to QCL and a quality measurement value related to each of the at least one DL RS.

According to various embodiments, the second RS resource may be obtained from the at least one RS resource for positioning based on a propagation time related to each of the at least one DL RS resource.

According to various embodiments, the one or more processors included in the UE may report a measurement value related to the positioning.

According to various embodiments, for the measurement value related to the positioning, at least one of: (i) the measurement value related to the positioning is obtained based on the compensation value being applied to the measurement value related to the positioning for the first RS resource; or (ii) the measurement value related to the positioning comprising the measurement value related to the positioning for the first RS resource and the compensation value, may be satisfied.

According to various embodiments, the compensation value may be acquired based on a difference between the measurement value related to the positioning for the first RS resource and an estimated measurement value related to the positioning for the second RS resource.

According to various embodiments, the first RS resource may be an RS resource corresponding to the maximum (maximum) RSRP among one or more RS resources for the positioning.

According to various embodiments, the second RS resource may be an RS resource corresponding to the minimum propagation time among at least one RS for the positioning.

According to various embodiments, the compensation value may be acquired based on that (i) the first RS resource is different from the second RS resource and that (ii) a configuration related to a reception beam change operation is not received.

According to various embodiments, instead of obtaining the compensation value based on that (i) the first RS resource is different from the second RS resource and that (ii) a configuration related to the reception beam change operation is received, the second RS resource may be acquired based on a different QCL type-D configuration from the QCL type-D configuration obtained from the information related to the QCL.

According to various embodiments, the QCL type-D configuration obtained from the information related to the QCL may be related to data communication.

According to various embodiments, the different QCL type-D configuration from the QCL type-D configuration obtained from the information related to the QCL may be related to the positioning.

According to various embodiments, the quality measurement value may include at least one of: reference signal received power (RSRP), signal-to-interference-plus-noise ratio (SINR), or signal-to-noise ratio (SNR).

According to various embodiments, one or more processors included in a network node (or one or more processors of a communication device included in the network node may transmit information related to Quasi co-located (QCL) between at least one downlink (DL) Reference signal (RS) resource and at least one RS resource for positioning.

According to various embodiments, one or more RS resources for the positioning may be transmitted.

According to various embodiments, a measurement value for the positioning related to a compensation value for the positioning may be acquired based on that the first RS resource is different from the second RS resource.

According to various embodiments, the first RS resource may be acquired among one or more RS resources for the positioning based on the information related to the QCL and a quality measurement value related to each of the at least one DL RS.

According to various embodiments, the second RS resource may be acquired among one or more RS resources for the positioning based on a propagation time related to each of the at least one DL RS resource.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of communication system to which Various embodiments are applied

Various embodiments have been mainly described in relation to data transmission and reception between a BS and a UE in a wireless communication system. However, Various embodiments are not limited thereto. For example, Various embodiments may also relate to the following technical configurations.

The various descriptions, functions, procedures, proposals, methods, and/or operational flowcharts of the Various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
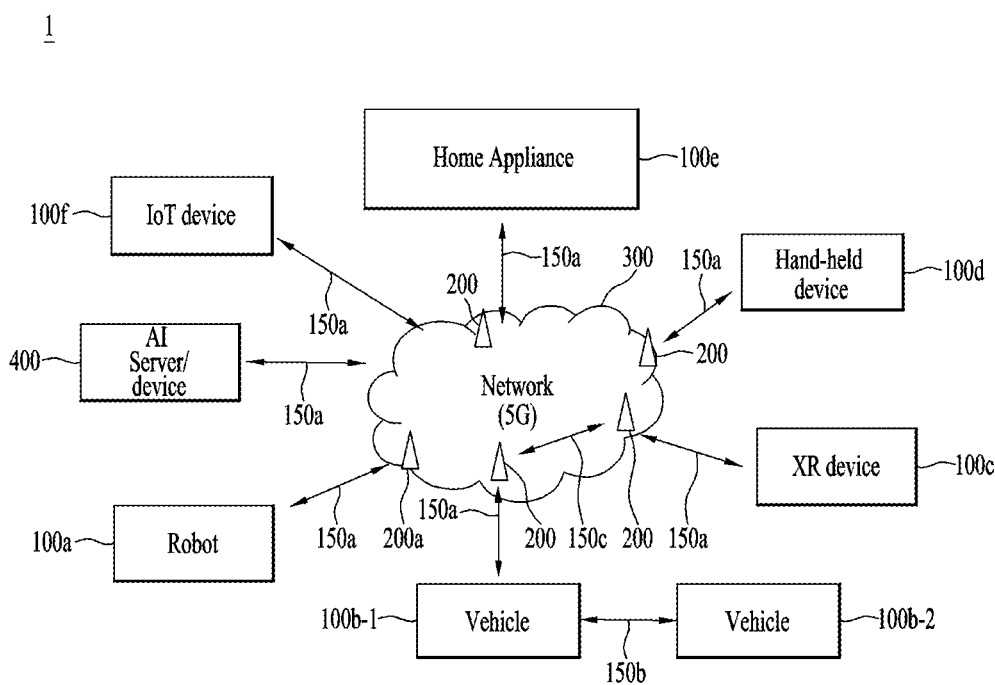
FIG. 28 illustrates an exemplary communication system to which various embodiments are applied.

FIG. 28 illustrates an exemplary communication system to which Various embodiments are applied.

Referring to FIG. 28, a communication system 1 applied to the Various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs i 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the Various embodiments.

Example of Wireless Devices to which Various Embodiments are Applied

Figure 29:
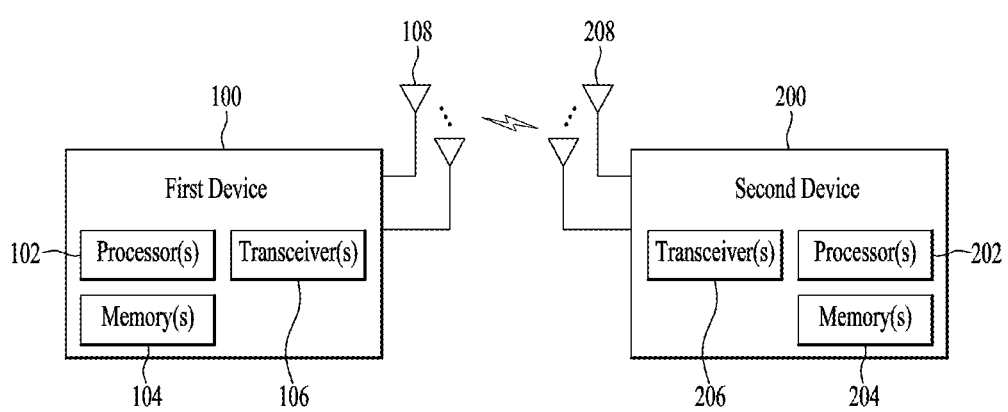
FIG. 29 illustrates exemplary wireless devices to which various embodiments are applicable.

FIG. 29 illustrates exemplary wireless devices to which Various embodiments are applicable.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the Various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the Various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or softwaare and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to Various embodiments, one or more memories (e.g., 104 or 204) may store instructions or programs which, when executed, cause one or more processors operably coupled to the one or more memories to perform operations according to various embodiments or implementations of the present disclosure.

According to Various embodiments, a computer-readable storage medium may store at least one instruction or computer programs which, when executed by one or more processors, cause the one or more processors to perform operations according to various embodiments or implementations of the present disclosure.

According to Various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Example of using wireless devices to which Various embodiments are applied

Figure 30:
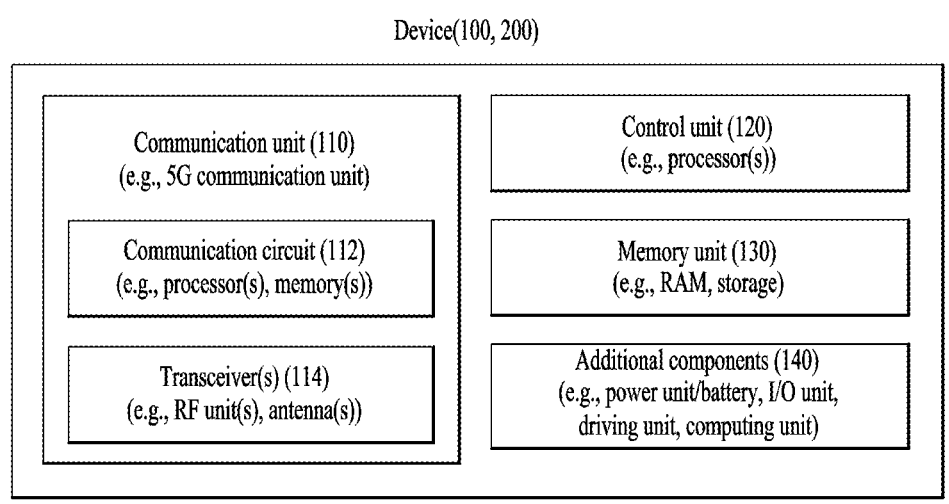
FIG. 30 illustrates other exemplary wireless devices to which various embodiments are applied.

FIG. 30 illustrates other exemplary wireless devices to which Various embodiments are applied. The wireless devices may be implemented in various forms according to a use case/service (see FIG. 28).

Referring to FIG. 30, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. W1), the vehicles (100*b*-1 and 100*b*-2 of FIG. W1), the XR device (100*c* of FIG. W1), the hand-held device (100*d* of FIG. W1), the home appliance (100*e* of FIG. W1), the IoT device (100*f* of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Example of Portable Device to Which Various Embodiments are Applied

Figure 31:
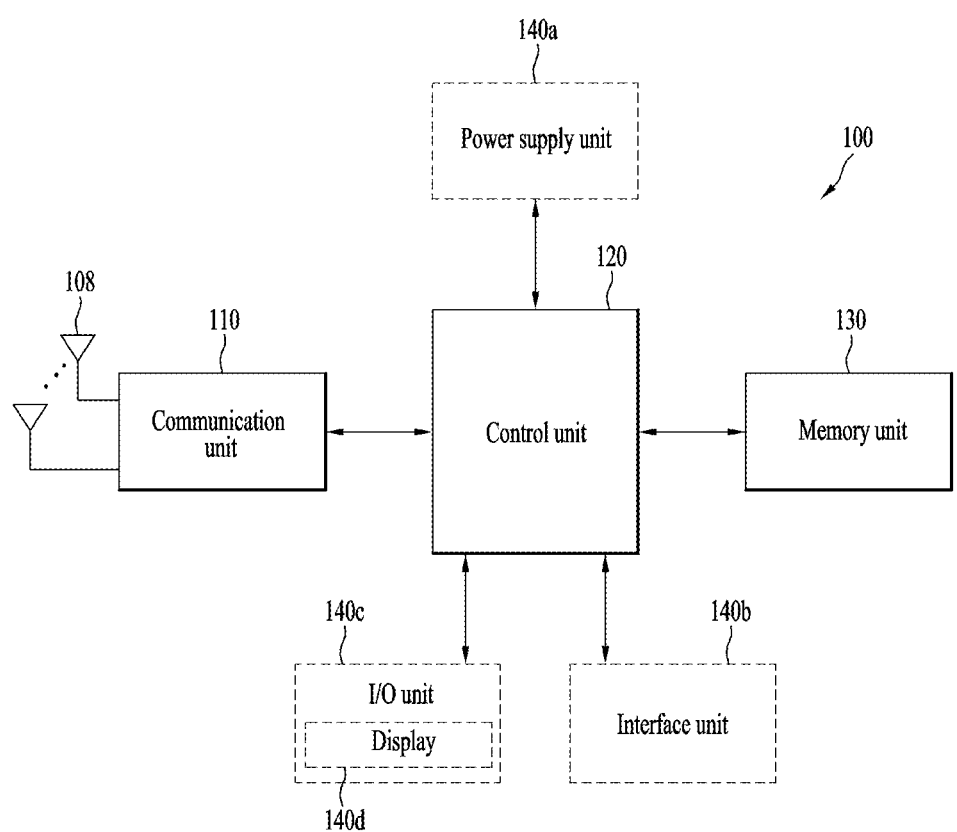
FIG. 31 illustrates an exemplary portable device to which various embodiments are applied.

FIG. 31 illustrates an exemplary portable device to which Various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 31, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or B Ss. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of vehicle or autonomous driving vehicle to which Various embodiments.

Figure 32:
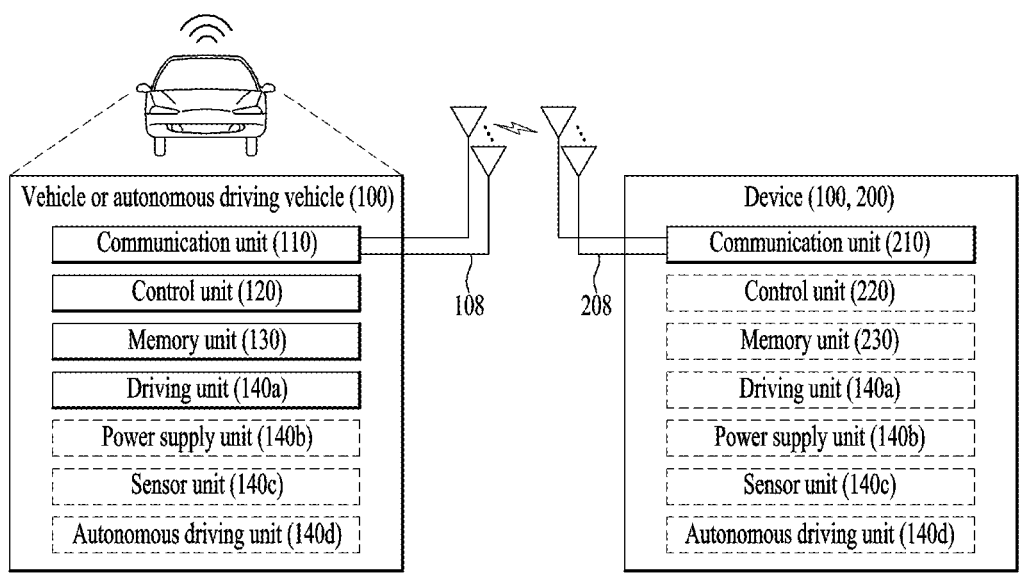
FIG. 32 illustrates an exemplary vehicle or autonomous driving vehicle to which various embodiments.

FIG. 32 illustrates an exemplary vehicle or autonomous driving vehicle to which Various embodiments. The vehicle or autonomous driving vehicle may be implemented as a mobile robot, a car, a train, a manned/unmanned aerial vehicle (AV), a ship, or the like.

Referring to FIG. 32, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, B Ss (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

What is claimed is:

1. A method performed by a user equipment (UE) configured to operate in a wireless communication system, the method comprising:
    transmitting, by the UE, a UE capability report related to positioning;
    receiving, by the UE, at least one positioning reference signal (PRS); and
    reporting, by the UE, measurement information including (i) reference signal received power (RSRP) information based on the at least one PRS,
    wherein the UE capability report includes information regarding whether additional PRS path reporting is supported by the UE,
    wherein, based on the additional PRS path reporting being supported by the UE, the measurement information further comprises (ii) additional PRS path information for reporting additional PRS paths, the additional PRS paths being different from a 1st PRS path detected first in time, and
    wherein the (ii) additional PRS path information for reporting the additional PRS paths comprises a first reporting content regarding each additional PRS path received power value and a second reporting content regarding each additional PRS path timing.

2. The method of claim 1, wherein the measurement information comprises (iii) physical cell ID information and (iv) PRS resource ID information.

3. The method of claim 1, wherein the measurement information is related to a reference signal time difference (RSTD).

4. The method of claim 1, wherein the UE is configured to report the additional PRS path information in addition to the 1st PRS path.

5. A user equipment (UE) configured to operate in a wireless communication system, the UE comprising:
a transceiver; and
at least one processor coupled with the transceiver, wherein the at least one processor is configured to:
transmit a UE capability report related to positioning;
receive at least one positioning reference signal (PRS); and
report measurement information including (i) reference signal received power (RSRP) information based on the at least one PRS,
wherein the UE capability report includes information regarding whether additional PRS path reporting is supported by the UE,
wherein, based on the additional PRS path reporting being supported by the UE, the measurement information further comprises (ii) additional PRS path information for reporting additional PRS paths, the additional PRS paths being different from a 1st PRS path detected first in time, and
wherein the (ii) additional PRS path information for reporting the additional PRS paths comprises a first reporting content regarding each additional PRS path received power value and a second reporting content regarding each additional PRS path timing.

6. The UE of claim 5, wherein the measurement information comprises (iii) physical cell ID information and (iv) PRS resource ID information.

7. The UE of claim 5, wherein the measurement information is related to a reference signal time difference (RSTD).

8. The UE of claim 5, wherein the at least one processor is configured to report the additional PRS path information in addition to the 1st PRS path.

9. A base station configured to operate in a wireless communication system, the base station comprising:
a transceiver; and
at least one processor coupled with the transceiver, wherein the at least one processor is configured to:
receive, from a user equipment (UE), a UE capability report related to positioning;
transmit at least one positioning reference signal (PRS); and
receive, from the UE, measurement information including (i) reference signal received power (RSRP) information related to the at least one PRS,
wherein the UE capability report includes information regarding whether additional PRS path reporting is supported by the UE,
wherein, based on the additional PRS path reporting being supported by the UE, the measurement information further comprises (ii) additional PRS path information for reporting additional PRS paths, the additional PRS paths being different from a 1st PRS path detected first at the UE in time, and
wherein the (ii) additional PRS path information for reporting the additional PRS paths comprises a first reporting content regarding each additional PRS path received power value and a second reporting content regarding each additional PRS path timing.

10. A method performed by a base station configured to operate in a wireless communication system, the method comprising:
receiving, by the base station from a user equipment (UE), a UE capability report related to positioning;
transmitting, by the base station, at least one positioning reference signal (PRS); and
receiving, by the base station from the UE, measurement information including (i) reference signal received power (RSRP) information related to the at least one PRS,
wherein the UE capability report includes information regarding whether additional PRS path reporting is supported by the UE,
wherein, based on the additional PRS path reporting being supported by the UE, the measurement information further comprises (ii) additional PRS path information for reporting additional PRS paths, the additional PRS paths being different from a 1st PRS path detected first at the UE in time, and
wherein the (ii) additional PRS path information for reporting the additional PRS paths comprises a first reporting content regarding each additional PRS path received power value and a second reporting content regarding each additional PRS path timing.

* * * * *